(12) United States Patent
Nakagawa et al.

(10) Patent No.: US 8,352,790 B2
(45) Date of Patent: Jan. 8, 2013

(54) ABNORMALITY DETECTION METHOD, DEVICE AND PROGRAM

(75) Inventors: Hiromitsu Nakagawa, Kokubunji (JP); Yasuhide Mori, Tokyo (JP); Tomohiro Nakamura, Hachioji (JP); Katsuro Kikuchi, Musashino (JP)

(73) Assignee: Hitachi, Ltd., Tokyo (JP)

( * ) Notice: Subject to any disclaimer, the term of this patent is extended or adjusted under 35 U.S.C. 154(b) by 297 days.

(21) Appl. No.: 12/709,832

(22) Filed: Feb. 22, 2010

(65) Prior Publication Data

US 2011/0029817 A1 Feb. 3, 2011

(30) Foreign Application Priority Data

Jul. 30, 2009 (JP) .................................. 2009-177978

(51) Int. Cl.
*G06F 11/00* (2006.01)
(52) U.S. Cl. .......................................... 714/26; 709/223
(58) Field of Classification Search .................... 714/36
See application file for complete search history.

(56) References Cited

U.S. PATENT DOCUMENTS

| | | | | |
|---|---|---|---|---|
| 5,974,572 A * | 10/1999 | Weinberg et al. | ............ | 714/47.2 |
| 6,052,694 A * | 4/2000 | Bromberg | ............ | 1/1 |
| 6,789,046 B1 * | 9/2004 | Murstein et al. | ............ | 702/182 |
| 7,120,832 B2 * | 10/2006 | Collins et al. | ............ | 714/42 |
| 7,395,187 B2 * | 7/2008 | Duyanovich et al. | ............ | 702/183 |
| 7,523,190 B1 * | 4/2009 | Bickerstaff et al. | ............ | 709/224 |
| 7,627,671 B1 * | 12/2009 | Palma et al. | ............ | 709/224 |
| 7,711,520 B2 * | 5/2010 | Duyanovich et al. | ............ | 702/183 |
| 7,765,437 B2 * | 7/2010 | Gittins et al. | ............ | 714/47.2 |
| 7,873,321 B2 * | 1/2011 | Fok et al. | ............ | 455/67.11 |
| 2003/0061546 A1 * | 3/2003 | Collins et al. | ............ | 714/42 |
| 2003/0074528 A1 * | 4/2003 | Soejima et al. | ............ | 711/114 |
| 2003/0107548 A1 * | 6/2003 | Eun et al. | ............ | 345/156 |
| 2006/0195297 A1 * | 8/2006 | Kubota et al. | ............ | 702/187 |
| 2007/0198679 A1 * | 8/2007 | Duyanovich et al. | ............ | 709/223 |
| 2008/0183683 A1 * | 7/2008 | Barsness et al. | ............ | 707/3 |
| 2008/0209027 A1 * | 8/2008 | Duyanovich et al. | ............ | 709/223 |
| 2008/0215543 A1 * | 9/2008 | Huang et al. | ............ | 707/3 |
| 2008/0244316 A1 * | 10/2008 | Gittins et al. | ............ | 714/37 |

FOREIGN PATENT DOCUMENTS

| | | | |
|---|---|---|---|
| JP | 2001-142746 A | 5/2001 | |
| JP | 2008-191839 A | 8/2008 | |

* cited by examiner

*Primary Examiner* — Kamini Patel
(74) *Attorney, Agent, or Firm* — Mattingly & Malur, PC

(57) ABSTRACT

Model data is generated from performance information sorted by day of the week, time period, and process status by a performance information analysis section and a process status analysis section. An abnormality determination section detects abnormality using appropriate model data. What the graph of an expected status is like, how much the graph of the current status that has been determined abnormal differs from the graph of the expected status, and how much the current status is like the expected status are displayed allowing a system manager to observe detailed information about abnormality determination.

7 Claims, 17 Drawing Sheets

FIG. 3

| DATE | TIME | REQUESTED URL | | |
|---|---|---|---|---|
| 2009-3-26 | 21:13:53 | /index.html | ... | ... |
| 2009-3-26 | 21:13:53 | /favicon.ico | ... | ... |
| : | : | | | : |

301 — DATE
302 — TIME
303 — REQUESTED URL
201

FIG. 4

| DATE | TIME | PROCESS NAME | CPU UTILIZATION |
|---|---|---|---|
| 2009-03-22 | 21:30:21 | c:/Program Files/WebServer/httpd.exe | 5% |
| 2009-03-22 | 21:30:21 | c:/Program Files/SystemManager/backup.exe | 8% |
| : | : | : | |
| 2009-03-22 | 21:31:21 | c:/Program Files/WebServer/httpd.exe | 5% |
| 2009-03-22 | 21:31:21 | c:/Program Files/SystemManager/backup.exe | 6% |

401 — DATE
402 — TIME
403 — PROCESS NAME
404 — CPU UTILIZATION
202

FIG. 5A

| PERFORMANCE ID | DATE | TIME | TOTAL ACCESS COUNT |
|---|---|---|---|
| 2009032621-22 | 20090326 | 21-22 | 21230 |
| 20090326 2-23 | 20090326 | 22-23 | 40320 |
| 2009032623-24 | 20090326 | 23-24 | 20100 |
| 200903260-1 | 20090327 | 0-1 | 10000 |
| | : | : | : |

FIG. 5B

| PERFORMANCE ID | REQUESTED URL | ACCESS COUNT |
|---|---|---|
| 2009032621-22 | URL1 | 3130 |
| 2009032621-22 | URL2 | 4000 |
| : | : | : |
| 20090326 2-23 | URL1 | 3210 |
| 20090326 2-23 | URL2 | 2210 |
| : | : | : |

FIG. 5C

| PERFORMANCE ID 521 | CHARACTERISTIC PROCESS NAME 522 | AVERAGE CPU UTILIZATION 523 | PROCESS PROPERTY 524 |
|---|---|---|---|
| 2009032621-22 | c:/Program Filess/WebServer/httpd.exe | 8% | 21:00:00 START |
| 2009032621-22 | c:/Program Files/SystemManager/backup.exe | 7% | 21:00:00 START |
| 2009032621-22 | c:/Program Files/AntiVirus/update.exe | 7% | 21:45:00 START |
| 20090326 2-23 | c:/Program Filess/WebServer/httpd.exe | 8% | 22:00:00 START |
| 20090326 2-23 | c:/Program Files/AntiVirus/update.exe | 5% | 22:00:00 START |
| : | : | : | |

| PROCESS NAME 531 | TASK NAME 532 |
|---|---|
| c:/Program Filess/WebServer/httpd.exe | WEB SERVER |
| c:/Program Files/SystemManager/backup.exe | BACKUP |
| c:/Program Files/AntiVirus/update.exe | VP UPDATE |
| : | : |

530

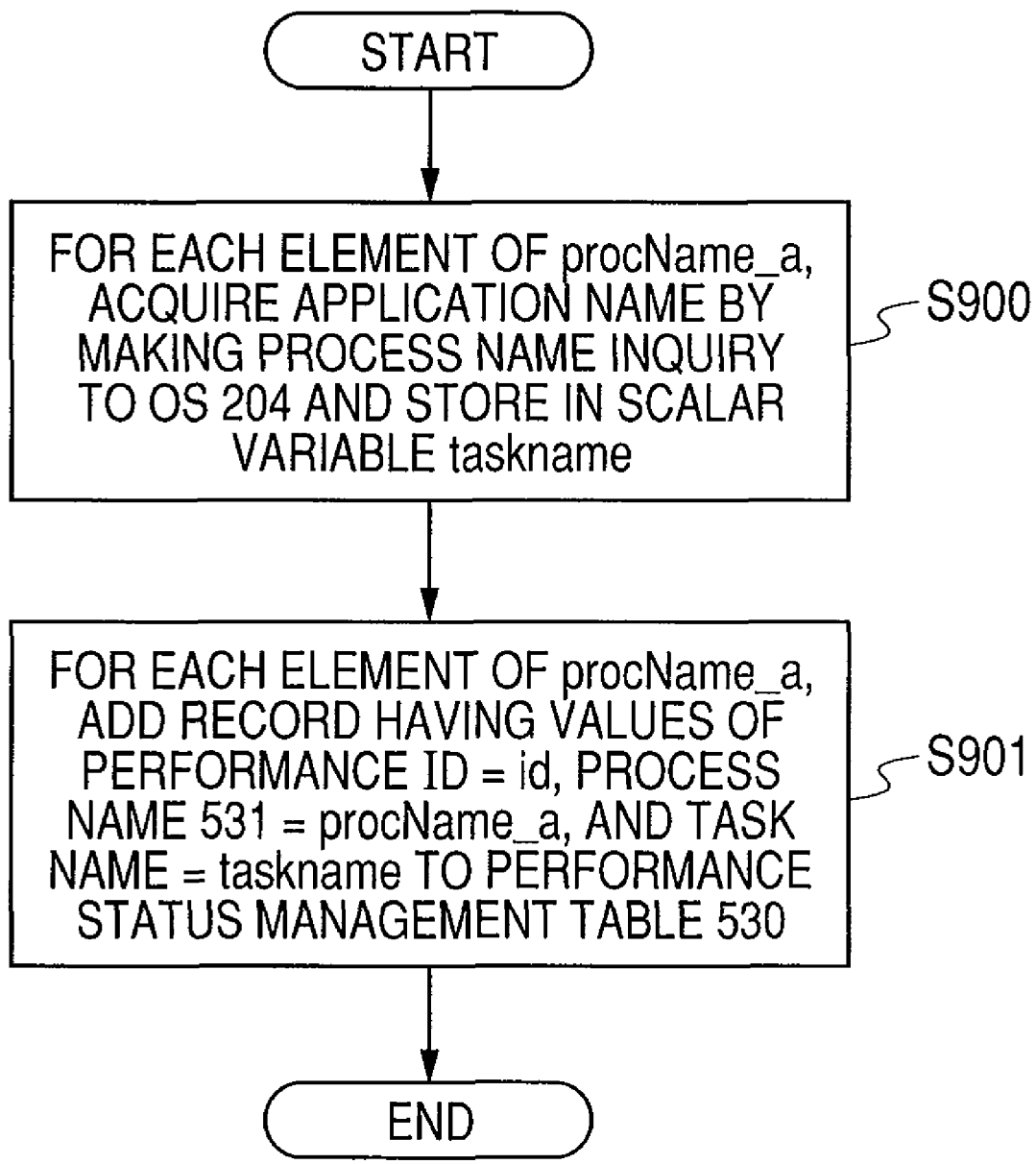

FIG. 10

| DAY-OF-THE-WEEK CONDITION | TIME PERIOD CONDITION | CHARACTERISTIC PROCESS |
|---|---|---|
| MONDAY | 9-10 | c:/Program Filess/WebServer/httpd.exe<br>c:/Program Files/SystemManager/backup.exe<br>c:/Program Files/AntiVirus/update.exe |
| MONDAY | 10-11 | c:/Program Filess/AntiVirus/update.exe<br>c:/Program Filess/WebServer/httpd.exe<br>c:/Program Files/SystemManager/backup.exe |
| ⋮ | ⋮ | |
| ⋮ | ⋮ | |
| FRIDAY | 22-23 | c:/Program Filess/WebServer/httpd.exe<br>c:/Program Files/SystemManager/backup.exe<br>c:/Program Files/AntiVirus/update.exe |
| FRIDAY | 23-0 | c:/Program Filess/WebServer/httpd.exe<br>c:/Program Files/SystemManager/backup.exe<br>c:/Program Files/AntiVirus/update.exe |
| ⋮ | ⋮ | ⋮ |

FIG. 14

| TASK NAME | AVERAGE CPU UTILIZATION | PROCESS PROPERTY |
|---|---|---|
| VP UPDATE | 15% | 21:45:00 START |
| WEB SERVER | 8% | 21:00:00 START |
| BACKUP | 4% | 21:45:00 START |

1401  1402  1403

OK — 1404

1400

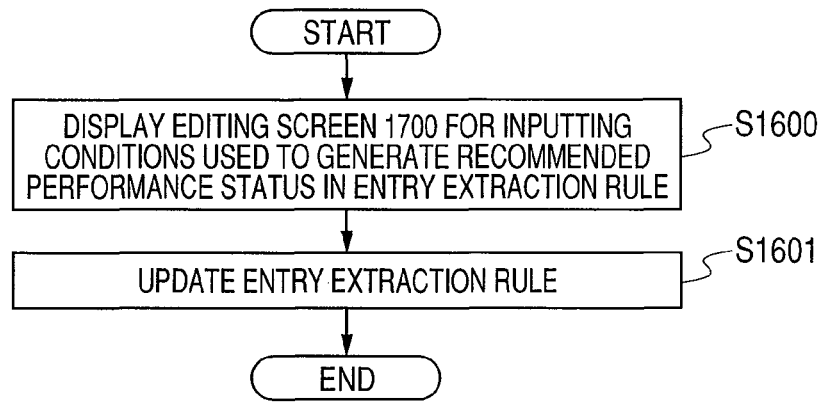
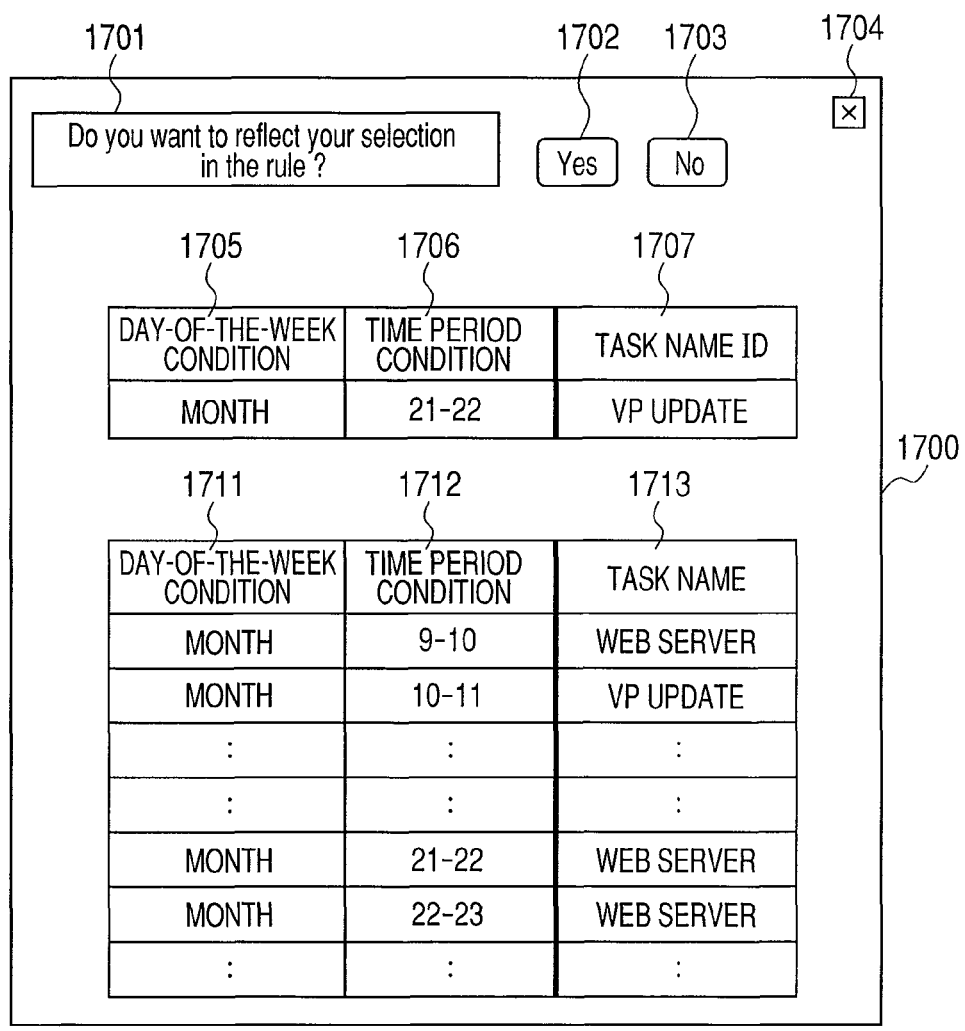

ABNORMALITY DETECTION METHOD, DEVICE AND PROGRAM

CLAIM OF PRIORITY

The present application claims priority from Japanese patent application JP 2009-177978 filed on Jul. 30, 2009, the content of which is hereby incorporated by reference into this application.

FIELD OF THE INVENTION

The present invention relates to an abnormality detection technique for detecting abnormality in a device to be monitored based on past and current performance information on the device.

BACKGROUND OF THE INVENTION

Recently, with Web-based applications for business systems increasing and Internet businesses spreading, the scale of businesses handled by Web systems has been expanding. In such a situation, it is absolutely necessary to enhance the reliability of Web systems. Abnormalities occurring in Web systems are, however, quite diversified, and causes for such abnormalities also vary widely, for example, from software bugs to operator errors. It is, therefore, difficult to completely prevent the occurrence of such abnormalities. Hence, based on the idea that the occurrence of abnormality in a Web system is inevitable, various techniques for abnormality detection have been developed so as to allow appropriate measures to be taken quickly when abnormality is detected. In recent Web systems increasingly having concealed structures using components from multiple vendors, it is often difficult to obtain data about system abnormalities. Against such a background, abnormality detection techniques have been proposed in which model data on system performance is generated based on past normal performance information, which is relatively easily obtainable, then abnormality is determined based on the degree of difference between the model data and current performance information.

In terms of the present invention, the term "abnormality" refers to a system status in which it may occur that the Service Level Agreement (SLA) is not met due to, for example, a hardware stoppage or malfunction, a CPU or network overload, or a memory area shortage. Also, the term "model data" refers to typical normal performance information obtained, for example, by averaging past normal performance information.

Among existing techniques for abnormality detection, there are those disclosed in JP-A No. 2001-142746 and JP-A No. 2008-191839. In the technique disclosed in JP-A No. 2001-142746, load model data representing transition with time of the load on a computer system is generated based on past load information on the computer system, a threshold load value is determined using the load model data for a time corresponding to the current time, and system abnormality is determined according to whether or not the current load exceeds the threshold load value. In the technique disclosed in JP-A No. 2008-191839, pattern data representing periodic changes in performance of a computer system is generated based on past performance data and, when the current performance data does not match any past pattern included in the generated pattern data, the computer system is determined to have abnormality.

SUMMARY OF THE INVENTION

In the technique disclosed in JP-A No. 2001-142746, model data for a time corresponding to the current time is used for abnormality determination. Therefore, if a normal event unexpectedly takes place at the specific time causing the load on the system to change, erroneous abnormality detection may result. In the technique disclosed in JP-A No. 2008-191839, system abnormality is determined according to whether or not the system is following a past periodicity of its performance. Therefore, if, while the periodicity is followed, a normal event unexpectedly takes place causing the system performance data to fluctuate, erroneous abnormality detection may result. As a countermeasure, when a performance change pattern causes erroneous abnormality detection, the pattern is treated as an exceptional pattern not to be detected thereafter. When the system configuration or environment subsequently changes, however, such an exceptional performance change pattern may come to really represent abnormality, that is, an abnormality detection error may result.

Assume a case in which a business system is monitored to count accesses to the server. Even in the mornings of weekdays, the server access count will largely vary, for example, between when the system is being updated and when it is not or between when an in-company event is taking place and when no such event is taking place. Hence, for reliable abnormality determination, it is necessary to prepare different model data for use in different situations. Thus, model data generated based only on time or periodicity is not always appropriate for use in abnormality determination.

In the technique disclosed in JP-A No. 2001-142746, when a system abnormality is detected, the detection is communicated to the system manager. In the technique disclosed in JP-A No. 2008-191839, when a system abnormality similar to one detected in the past is detected, information on the abnormality is communicated to the system manager. When a system abnormality similar to none of the abnormalities detected in the past is detected, however, only the detection is communicated to the system manager. When, therefore, abnormality is erroneously detected as described above, the system manager is required to determine that it is not real abnormality. Before making such determination, the system manager is required to closely analyze the current system performance, for example, by opening a log on the device being monitored and scanning through past error messages included in the log or by checking, using appropriate software, whether or not the network is properly functioning. Generally, confirming a normal status is more difficult than confirming an abnormal status, so that, by the time the system manger can determine that the system is in normal status and that the model data used for abnormality detection was not appropriate, a great amount of time would have been spent. Thus, when only a notice of abnormality detection is received, the system manager cannot determine whether the model data used to determine the abnormality is appropriate or not, and it takes time for the system manger to determine the appropriateness of the abnormality detection notified to him or her.

An object of the present invention is to provide an abnormality detection method, device, and program which can improve the abnormality detection accuracy represented, for example, by recall and precision by generating and using model data more appropriately representing a current status of a system for abnormality determination and which can reduce the time required by a system manger in determining the appropriateness of abnormality determination by communicating the reason for the determination to the system manager.

To achieve the above object, the present invention provides an abnormality detection method for detecting abnormality in a system to be monitored, the method using a device provided with a processing section and a storage section. In the method, the processing section executes the steps of: acquiring an access log and a process performance log from the system to be monitored; sorting the acquired access log by time and recording the sorted access log as performance information by time; analyzing and extracting one or more process statuses of the recorded performance information from the acquired process performance log; executing a task name assignment procedure to obtain one or more task names from the one or more analyzed and extracted process statuses; and associating the one or more task names with the performance information by time and recording as one or more performance statuses.

To achieve the above object, the present invention also provides an abnormality detection device for detecting abnormality in a system to be monitored, the device including a processing section and a storage section. In the device, the processing section comprises: a log collection control section which acquires an access log and a process performance log from the system to be monitored; a performance information analysis section which sorts the acquired access log by time and records the sorted access log as one or more performance statuses by time; a process status analysis/task name assignment section which extracts one or more process statuses of the one or more recorded performance statuses from the process performance log, obtains one or more task names from the one or more extracted process statuses, and records the one or more task names, associating them with the one or more recorded performance statuses; and an abnormality determination section which determines abnormality by calculating a degree of difference between a current performance status and a past performance status included in the one or more recorded performance statuses. Furthermore, the present invention provides an abnormality detection program for the processing section of the abnormality detection device.

In a preferred embodiment of the present invention, to achieve the above object, it is possible to generate model data more suitable to represent a current status by sorting performance information according to temporal periodicity and also according to process status. To be concrete, performance information, including, for example, access frequency information, obtained from an access log which is collected from a computer system being monitored and updated periodically is temporally sorted, for example, by day of the week or time period of the day. This makes it possible to generate model data by taking into consideration the temporal periodicity associated with, for example, day of the week and time period of the performance information to be analyzed. The temporally sorted performance information is further sorted by process status.

In the present specification, the term "process status" refers to information about process performance, for example, information as to what combination of processes were performed using what resources at what timings. Using such process status information makes it possible to generate model data by taking into consideration the temporal periodicity associated with, for example, day of the week or time period of the day, of the performance information to be analyzed and also taking into consideration the status of process performance. Also, in the present specification, the "process information sorted by time" that is prepared by taking into consideration the periodicity associated with, for example, day of the week or time period as well as the "process information sorted by process status" is referred to as the "performance status."

To detect abnormality according to the present invention, model data is prepared by extracting, based on past performance status data, entries mutually matching in terms of day of the week, time period, and process status and by averaging their performance information values; the statistical degree of difference between model data and current performance information values is calculated; and, when the statistical degree of difference exceeds a certain level, the current status is determined to be abnormal. The entry extraction is carried out complying with a rule prepared according to conditions, such as day of the week and time, making up an environment in which the computer system being monitored is operating.

Abnormality detection carried out, as described above, using model data generated from performance information sorted by day of the week, time period, and process status solves the foregoing problem that model data suitable for abnormality determination cannot be generated.

According to a preferred embodiment of the present invention, all data used for abnormality determination is displayed to show the system manger the reason for the determination. In addition, when possibly more suitable model data for abnormality determination is available, it is displayed as recommended model data, thereby suggesting that the current model data may not be appropriate for use. Furthermore, in cases where recommended model data is more suitable for use in abnormality determination than the current model data, additional model data conditions can be included in the conditions applied to entry extraction allowing the updated entry extraction conditions to be subsequently applied.

To be concrete, a model data graph, a current performance status graph, and a degree of difference between the model data and the current performance status are displayed on a monitoring screen for monitoring by the system manager.

The model data graph and the current performance status graph shown on the monitoring screen are each accompanied by process status information and a task name. A task name is the name of a task assumed, based on the process status, to have caused a tendency of graphs displayed on the monitoring screen. It refers to a performance status as a whole of the computer system being monitored. The task name is assigned to improve the readability of information displayed on the monitoring screen for the system manager. It may be, for example, an application name derived from a process name or a name determined by the system manager for use in system management and associated with a system management tool.

Furthermore, entries associated with a process status similar to the current performance status are extracted from past performance statuses, and performance information values of the extracted entries are averaged to generate model data representing a performance status similar to the current performance status. Such model data representing a performance status similar to the current performance status is recommended as model data possibly more suitable for use in abnormality determination than the current model data. When the recommended model data is selected by the system manager, the degree of difference between the recommended model data and the current performance information is displayed on the monitoring screen. In cases where the recommended model data is more suitable for current use for abnormality determination, the rule applied in generating the recommended model data can be added to the rule to be applied to entry extraction. The updated rule is displayed when abnormality determination is made next time. Abnormality determination is made according to a predetermined rule. The current status may be determined abnormal either when it differs from all model data generated at a time or when it differs from any of the model data generated at a time.

The foregoing problem that, as the suitability of the current model data used for abnormality determination cannot be determined, it takes time to determine whether or not a result of abnormality determination is appropriate is solved by showing relevant information, for example, what the model data graph is like, how much the graph of the current status that has been determined abnormal differs from the model data graph, or how much the current status resembles the model data status.

According to the present invention, it is possible to carry out abnormality determination taking into consideration events which take place without temporal periodicity and which are supposed to characteristically affect the process being performed. The results in improving the accuracy of abnormality detection represented, for example, by reproducibility and the goodness of fit. So far, when erroneous abnormality detection occurred, the system manager used to take much time to determine the appropriateness of the detection. According to the present invention, even if erroneous abnormality detection occurs, the system manager can know in detail why the abnormality detection resulted, so that the system manager can determine the appropriateness of the abnormality detection using less time than before.

BRIEF DESCRIPTION OF THE DRAWINGS

FIG. 3 is a diagram showing an example configuration of an access log providing data to be analyzed according to the first embodiment;

FIG. 4 is a diagram showing an example configuration of a process performance log providing data to be analyzed according to the first embodiment;

FIG. 5A is a diagram showing an example structure of a total access count table holding a result of analysis according to the first embodiment;

FIG. 5B is a diagram showing an example structure of an access count by URL table holding a result of analysis according to the first embodiment;

FIG. 5C is a diagram showing an example structure of a process status table holding a result of analysis according to the first embodiment;

FIG. 5D is a diagram showing an example structure of a task name table holding a result of analysis according to the first embodiment;

FIG. 9 is a flowchart of example processing performed by a task name assignment section of the abnormal detection device according to the first embodiment;

FIG. 10 is a diagram showing an example structure of an entry extraction rule table for use in abnormality determination according to the first embodiment;

FIG. 14 is a diagram showing the structure of a dialog displayed on the monitoring screen of the abnormality detection device according to the first embodiment;

FIG. 16 is a flowchart showing example of processing performed by a selection reflection section of the abnormality detection device according to the second embodiment;

FIG. 17 is a diagram showing an example structure of a user selection reflection screen of the abnormality detection device according to the second embodiment.

DETAILED DESCRIPTION OF THE PREFERRED EMBODIMENTS

Embodiments of the present invention will be described in the following sequentially referring to FIGS. 1 to 14. Note that, in the following description, elements of a program executed by a processing section may be each referred to as a "section," "function," or "procedure." For example, a performance information analysis program may be referred to as a "performance information analysis section," "performance information analysis function," or "performance information analysis procedure."

First Embodiment

The first embodiment being described below is a configuration in which model data is generated using an access log and a process performance log, processing to detect web server abnormality is performed, and, when any abnormality is detected, it is displayed on a screen along with the reason why it has been detected.

Figure 1:
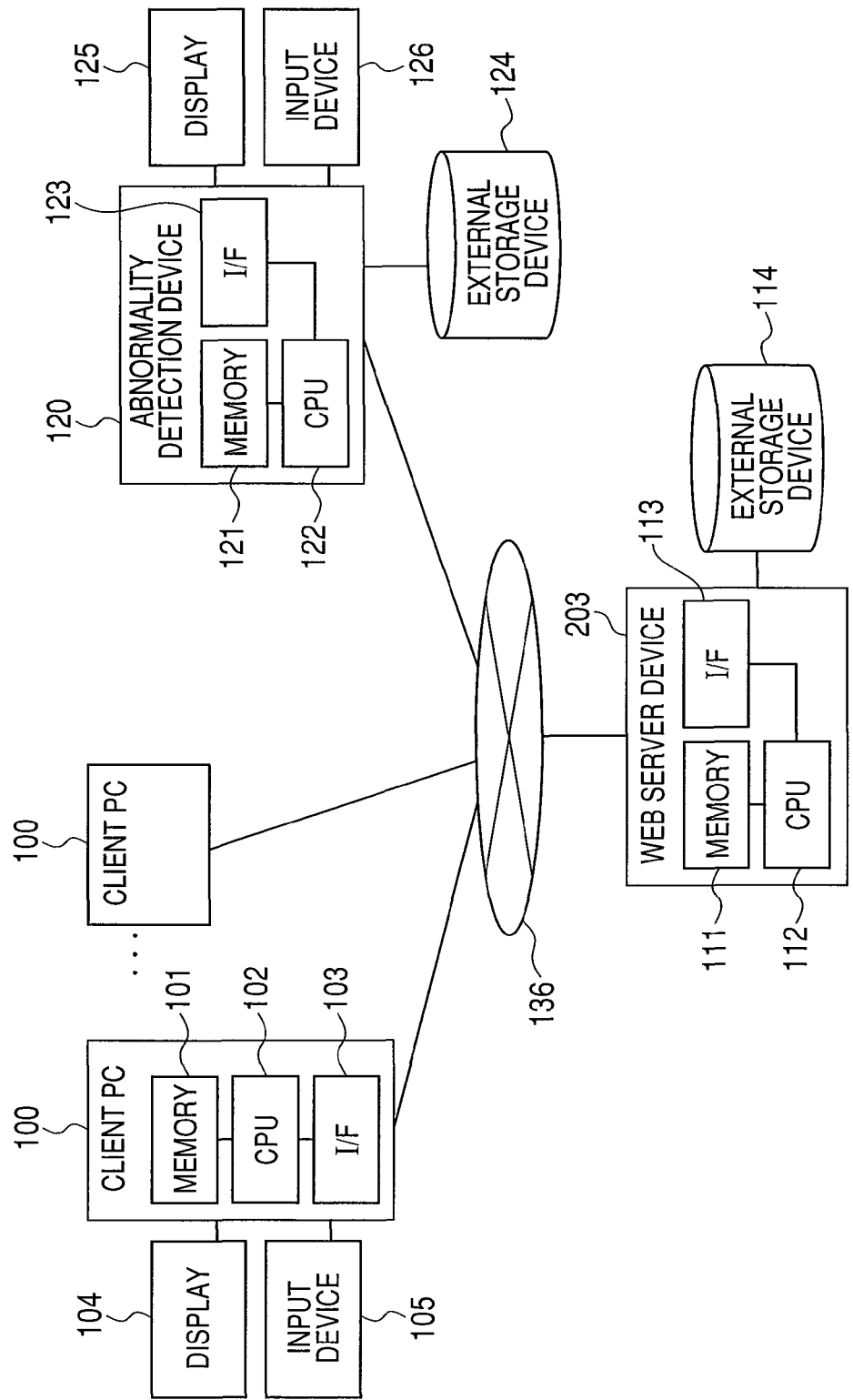
FIG. 1 is a block diagram of an example configuration of a computer system according to a first embodiment of the present invention.

FIG. 1 is a block diagram of an overall configuration of a computer system according to the first embodiment.

The computer system of the present embodiment includes a web server device 203 to provide web services, one or more clients' personal computers (PCs) 100 for using the services provided by the web server device 203, an abnormality detection device 120 for detecting abnormality in the web server device 203, and a network 136 connecting the computer system to other computer systems.

Each of the client PCs 100 is a computer having a central processing unit (CPU) 102, a memory 101 used as a storage section, and an interface (I/F) 103 which are interconnected via an internal bus. The computer is also connected with a display 104 and an input device 105. The CPU 102 executes programs stored in the memory 101. The memory 101 temporarily stores programs to be executed by the CPU 102 and required data. The programs include, for example, an operating system (OS) and a web browser. The I/F 103 is used to exchange data with external devices including the display 104, the input device 105, and the network 136. The display 104 displays information generated by computation performed by the CPU 102. The input device 105 accepts inputting from the user of the PC 100, for example, via a keyboard or a mouse. The PC 100 may also be connected with an external storage device though not shown in FIG. 1.

The web server device 203 is a server used, for example, to provide the client PCs 100 with information and business systems. The web server device 203 includes, similarly to each client PC 100, a CPU 112, a memory 111, an I/F 113, and an external storage device 114. The external storage device 114 stores web pages to be published on the web. The web pages are written in a language, for example, Hyper Text Markup Language (HTML) compatible with a web client program running on the client PC 100. The web pages are each associated with a Uniform Resource Locator (URL) used as a web page identifier. A web server program running on the web server device 203 receives Hyper Text Transfer Protocol (HTTP) requests, each including a URL, from the web client program.

The web server program then acquires the web page associated with the URL received from the web client program from the external storage device 114 and transmits the web page to the web client program as an HTTP response. Transmission and reception of such a web page is carried out using a communication protocol, for example, HTTP, via the network 136. There are cases where, besides providing static web pages stored in the external storage device 114, the web server program dynamically generates and provides a web page by using, for example, a web application server, a Common Gateway Interface (CGI) system, and a data base system.

The abnormality detection device 120 included in the computer system of the present embodiment includes, similarly to the client PC 100, a CPU 122, a memory 121, an I/F 123, an external storage device 124, a display 125, and an input device 126. As is known from the foregoing description, the abnormality detection device 120 has a general computer configuration similar to that of the client PC 100. Its internal operation is similar to that of the client PC 100. Programs to operate in the abnormality detection device 120 will be described in detail with reference to FIGS. 2 to 14.

The network 136 interconnects plural computer systems. The network 136 may be an intra-company Local Area Network (LAN), a Wide Area Network (WAN) interconnecting LANs, or a network provided by an Internet Service Provider (ISP).

In the present embodiment, the abnormality detection device 120 monitors the web server device 203 for abnormality detection.

Figure 2:
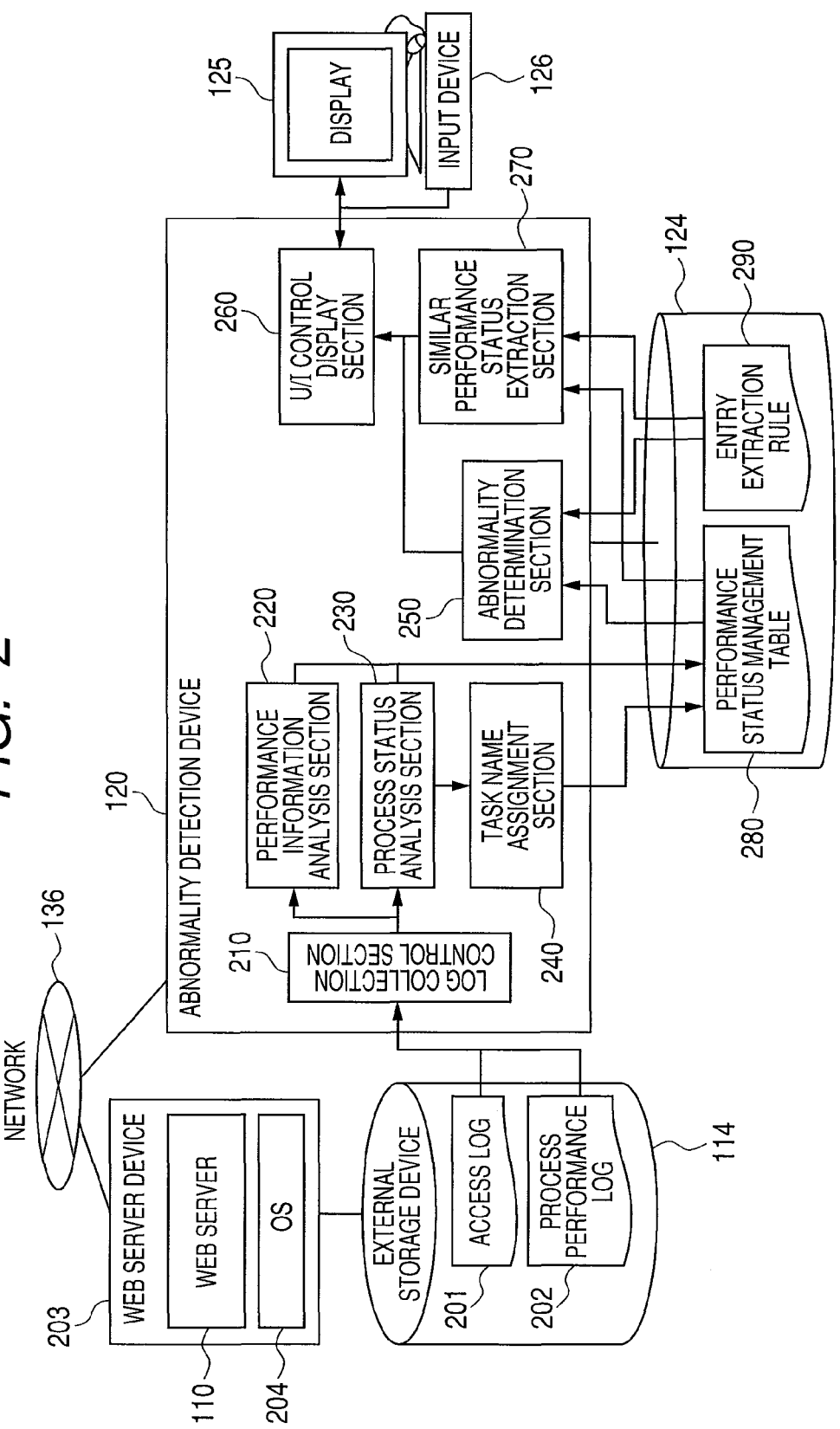
FIG. 2 is a block diagram showing example constituent functional elements of an abnormality detection device according to the first embodiment.

FIG. 2 is a block diagram showing constituent functional elements of a program to operate in the abnormality detection device 120 representing a characteristic of the present embodiment, an overall operating environment for which is shown in FIG. 1.

The web server device 203 includes an OS 204 and a web server 110 which is a program to run on the OS 204. These programs are stored in a storage such as the memory 111 and realize their functions by being executed on the CPU 112. The web server 110 and the OS 204 generates logs covering hardware and software operations and events such as processes performed and errors detected. Such logs are recorded, for example, to the external storage device 114 or a storage device connected to the network. In the present embodiment, abnormality detection is carried out using an access log 201 among the logs generated by the web server 110 and a process performance log 202 among the logs generated by the OS 204. The access log 201 is a record of HTTP requests, each indicating a URL, received from the web client program. The process performance log 202 is a record of process statuses representing instances of programs executed by the CPU 112. The structures of the access log 201 and the process performance log 202 will be described later.

The flow of abnormality detection processing carried out in the present embodiment will be outlined with reference to FIG. 2. The abnormality detection device 120 acquires, via the network 136, the access log 201 and the process performance log 202 stored in the external storage device 114 connected to the web server device 203 and analyzes the acquired logs to determine whether the web server device 203 has abnormality. The result of the determination is outputted to the display 125 of the abnormality detection device 120 via a user interface (U/I) control display section 260. Namely, the abnormality detection processing is broadly divided into (1) log collection, (2) log analysis, (3) abnormality determination, and (4) determination result display.

To be more concrete, the log collection (1) is composed of a log collection control section 210. The log collection control section 210 acquires the access log 201 and the process performance log 202 on the web server device 203 that is the target of monitoring and transmits the acquired logs to a performance information analysis section 220 and a process status analysis section 230. To acquire the access log 201 and the process performance log 202, a file transport protocol (FTP) and file sharing capabilities such as Common Internet File System (CIFS) and Network File System (NFS) are used. Or, a special file transfer program for an abnormality detection device may be used by keeping the program on the device to be monitored. The log collection control section 210 invokes an abnormality determination section 250 and a similar performance status extraction section 270 when a performance status management table 280 stored in the external storage device 124 is updated by the performance information analysis section 220 and a task name assignment section 240.

The log analysis (2) is composed of the performance information analysis section 220, the process status analysis section 230, and the task name assignment section 240. There are cases in which the process status analysis section 230 and the task name assignment section 240 are combinedly referred to as a process status analysis/task name assignment section.

The performance information analysis section 220 is a functional section for converting access log information into performance information, for example, access counts. The performance information analysis section 220 receives the access log 201 from the log collection control section 210 and extracts performance information such as the number of accesses made to each URL. The performance information thus extracted is recorded, for use in abnormality determination, in the performance status management table 280 stored in the external storage device 124. The performance status management table 280 will be described later.

The process status analysis section 230 is a functional section for converting process performance log information into process status, that is, process performance information indicating, for example, what combination of processes were performed at what timings using what resources. The process status information extracted is recorded, for use in abnormality determination, in the performance status management table 280 stored in the external storage device 124.

The task name assignment section 240 is a functional section for assigning a task name to improve, for a system manager, the readability of information displayed on a monitoring screen being described later. A task name is the name of a task assumed, based on process status, to have caused a tendency of performance information values. A task name represents a performance status as a whole of the web server device 203. A task name may be, for example, an application name determined according to a process name based on the process status information received from the process status analysis section 230. Or, a name determined by the system manager for use in system management and associated with a system management tool may be assigned as a task name.

As described above, the present embodiment is aimed at generating higher accuracy model data using the process performance log 202 in addition to the access log 201 for information analysis.

The performance status management table 280 is a table generated by analyzing the access log 201 and the process performance log 202. The performance status management table 280 includes information, for example, such performance information as the total number of accesses made during each unit time period and the number of accesses made to each URL, the names of characteristic processes performed during each unit time period, the amount of resources such as the CPU and memories which were in use by processes, and task names determined based on processes. The detailed structure of the performance status management table 280 will be described later.

The abnormality determination (3) is performed by the abnormality determination section 250 and the similar performance status extraction section 270.

The abnormality determination section 250 is invoked by the log collection control section 210 and performs abnormality determination based on the performance status management table 280 and an entry extraction rule 290, including rules for entry selection, both stored in the external storage device 124. For abnormality detection: entries which are identical in terms of day of the week, time period, and process status are extracted based on past performance status, and model data is generated by averaging performance information values for the extracted entries; a statistical degree of difference between the model data and the current performance status is calculated; and, when the statistical degree of difference is larger than a criterion, it is determined to represent abnormality. The entry extraction is carried out based on the entry extraction rule 290. In abnormality determination, a degree of similarity between the model data and the current performance status is calculated. The algorithms for calculating the degree of difference and the degree of similarity will be described later. The degree of difference, the degree of similarity, and data used to calculate them are displayed on the display 125.

The similar performance status extraction section 270 is invoked by the log collection control section 210 and, based on the performance status management table 280 and the entry extraction rule 290 both stored in the external storage unit 124, performs processing similar to that performed by the abnormality determination section 250 using model data representing process performance status similar to the current performance status. The degree of difference and the degree of similarity calculated by the similar performance status extraction section 270, and the data used to calculate them are displayed on the display 125 as recommended model data possibly more suitable for current abnormality determination.

The determination result display (4) is composed of the U/I control display section 260.

The U/I control display section 260 is a functional section which displays the result of abnormality determination, reason for the determination, and recommended model data, and accepts input from the system manager.

The U/I control display section 260 displays a model data graph, a current performance status graph, and the degree of difference between the model data and the current performance status based on the degree of difference, the degree of similarity, and data used to calculate them received from the abnormality determination section 250. The graphs displayed are accompanied by relevant information such as respective process status and task names. The monitoring screen will be described in detail later.

The U/I control display section 260 also displays a graph f recommended model data based on the degree of difference, the degree of similarity, and data used to calculate them received from the abnormality determination section 250. The graph of recommended model data is displayed together with relevant information such as process status and a task name. Furthermore, the U/I control display section 260 accepts input from the input device 126, and when, for example, the system manager selects the recommended model data, displays the corresponding degree of difference on the monitoring screen.

The functional sections of the abnormality detection device 120 and the detailed structures of data stored in the external storage devices included in the abnormality detection device 120 will be described in the following.

FIG. 3 is a diagram showing an example configuration of the access log 201 generated by the web server 110. When an HTTP request including an access destination URL is received from a client PC 100, the web server 110 performs required processing, transmits a response to the client PC 100, and records, as an access log, relevant information such as date and time of processing the request and the requested URL to the external storage device 114.

In the present embodiment, the access log 201 includes such columns as a date 301, a time 302, and a requested URL 303. When the access log 201 includes more information, only the information included in the date 301, time 302, and requested URL 303 columns is acquired through filtering. The access log 201 is used to analyze the access status of the web server 110. The access status analyzed is used to calculate the degree of difference for use in detecting abnormality in the web server 110.

FIG. 4 is a diagram showing an example structure of the process performance log 202 generated by the OS 204. When the CPU 102 executes a program stored in the memory 101, the OS 204 records such information as a process name which is an instance for executing the program and a CPU utilization to the external storage device 114 as a process performance log. The process performance log may be recorded in binary format or Comma Separated Values (CSV) format.

In the present embodiment, the process performance log 202 includes such columns as a date 401, a time 402, a process name 403, and a CPU utilization 404. The process performance log can also be generated, for example, using PerformanceCounter class of a program language. When the process performance log includes more information, only the information included in the data 401, time 402, process name 403, and CPU utilization 404 columns are acquired through filtering. Each value in the CPU utilization 404 column represents, for each unit time period, the ratio of the time during which the CPU 112 was occupied for program execution by the process defined by the corresponding process name in the process name 403 column. The process performance log 202 is used to analyze the process performance status of the web server device 203. The process performance status analyzed is used to extract entries required to calculate the degree of difference for use in detecting abnormality in the web server device 203 and to display details of an abnormality determination result on the monitoring screen.

FIGS. 5A to 5D are diagrams showing structures of the performance status management table 280 stored in the external storage device 124. The performance status management table 280 includes, broadly classified, four kinds of information, i.e. the total number of accesses made during each unit time period, the number of accesses made to each URL during each unit time period, the process status during each unit time period, and task names. These four kinds of information are recorded in the formats shown in FIGS. 5A to 5D, respectively.

FIG. 5A shows the structure of a total access count table 500. The total access count table 500 holds the number of access requests made from client PCs 100 to the web server 110 during each unit time period. The total access counts listed in the table are used by the abnormality determination section 250 when calculating a degree of difference or by the U/I control display section 260 for display on the monitoring screen. The total access count table has such columns as a performance ID 501 for record identification, a date 502, a time 503, and a total access count 504.

FIG. 5B shows the structure of an access count by URL table 510. The access count by URL table 510 holds the number of access requests made for each URL from client PCs 100 to the web server 110 during each unit time period. The access counts by URL are used by the abnormality determination section 250 when calculating a degree of difference. The access count by URL table 510 has such columns as a performance ID 511 for record identification, a requested URL 512, and an access count 513.

FIG. 5C shows the structure of a process status table 520. The process status table 520 holds process status information indicating what combination of processes were performed at what timings using which resources. The process status information is used by the abnormality determination section 250 when extracting entries from the performance status management table 280 to generate model data or by the U/I control display section 260 for display on the monitoring screen. The process status table 520 has such columns as a performance ID 521 for record identification, a characteristic process name 522 indicating characteristic processes performed during each unit time period, an average CPU utilization 523 indicating the average CPU utilizations of the characteristic processes, and a process property 524. In the present embodiment, each process property included in the process property 524 column represents a process start time or a process end time during each unit time period. It may be a different kind of information characteristic of the corresponding process, for example, the name of a parent process, process performance time, name of the communication port used by the process, or the amount of computer resources occupied by the process. Assume, for example, a case of writing data to a CD-R. The system behaves differently depending on whether it is preparing the data to be written, it is writing the data, or it is closing the writing session. Such differences in system behavior can be considered differently based on information about process combination and process property given by the process status table 520.

FIG. 5D shows the structure of a task name table 530. The task name table 530 links process names and task names. It improves data readability on the monitoring screen, being described later, for the system manager. A task name is the name of a task assumed, based on process status, to have caused a tendency of performance information values. It refers to a performance status as a whole of the web server device 203. A task name may be, for example, an application name determined according to a process name based on the process status information received from the process status analysis section 230. Or, a name determined by the system manager for use in system management and associated with a system management tool may be assigned as a task name. The task name table 530 has such columns as a process name 531 and a task name 532.

Figure 6:
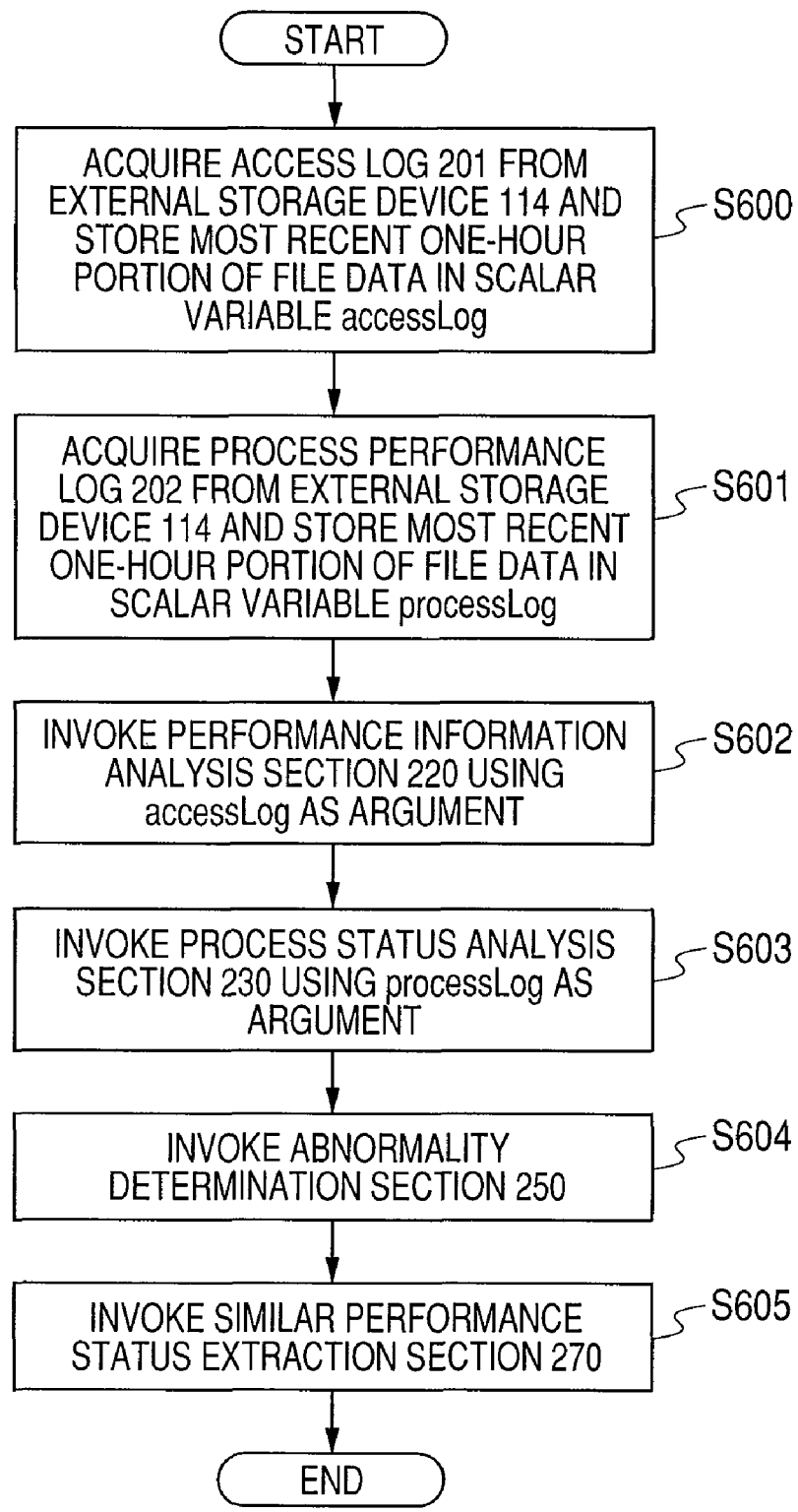
FIG. 6 is a flowchart of example processing performed by a log collection control section of the abnormal detection device according to the first embodiment.

FIG. 6 is a flowchart of processing performed by the log collection control section 210.

The log collection control section 210 is driven at one-hour intervals. After receiving an update log of the web server, the log collection control section 210 invokes plural functional sections of the abnormality detection device. This process is performed in a loop by using, for example, a timer function of an OS or program. Setting the activation interval to, for example, one hour is equivalent to assuming that the performance status is settled for each one-hour period. Even though, in the present embodiment, the activation interval is set to one hour, it may be arbitrarily set, for example, to 30 minutes or two hours.

First, in step S600, the access log 201 is acquired from the external storage device 114, and the most recent one hour portion of the file data is stored in scalar variable accessLog. Hereinafter, a "scalar variable" refers to a variable for storing a numerical value or a character string. In step S601, the process performance log 202 is acquired from the external storage unit 114, and the most recent one hour portion of the file data is stored in scalar variable processLog. To acquire the access log 201 and the process performance log 202, a file transport protocol such as FTP and a file sharing function such as Common Internet File System (CIFS) or Network File System (NFS) may be used. Or, the logs may be acquired by keeping a special file transport program for the abnormality detection device on the device to be monitored. When the access log 201 and the process performance log 202 are acquired, only the most recent one hour portions of their file data are stored in the respective scalar variables for use in updating the respective logs acquired when the log collection control section 210 was previously activated. The update can be carried out, for example, by using a file point function of a program language. The file point function can determine a file position where to start updating of the file data. In step S602, the performance information analysis section 220 is invoked using argument accessLog. In step S603, the process status analysis section 230 is invoked using argument processLog. These two functional sections may be invoked in any order, that is, steps S602 and S603 may be reversed in order. In step S604, the abnormality determination section 250 is invoked. In step S605, the similar performance status extraction section 270 is invoked. These two functional sections may be invoked in any order, that is, steps S604 and S605 may be reversed in order. The above steps completes the process of log collection.

Figure 7:
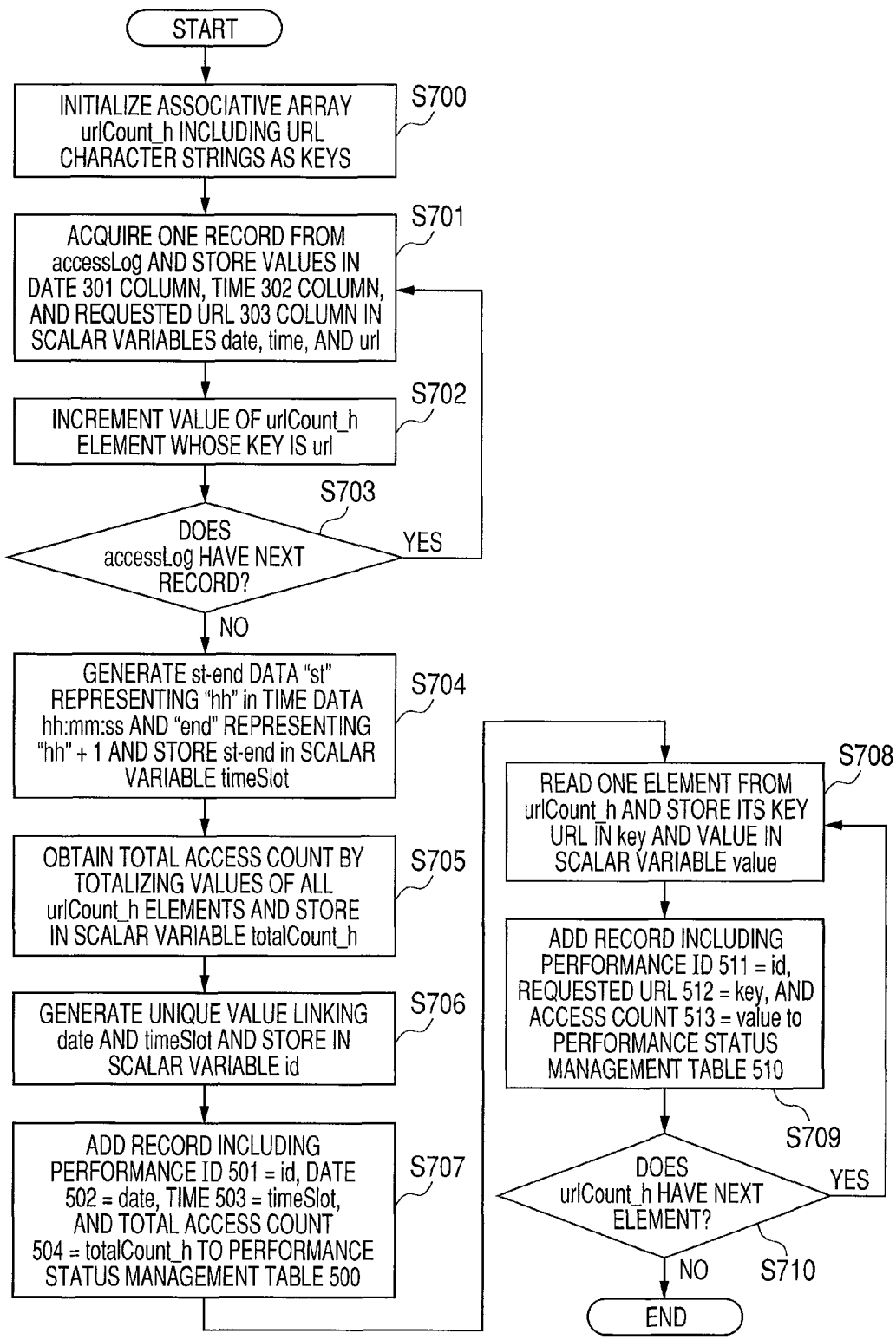
FIG. 7 is a flowchart of example processing performed by a performance information analysis section of the abnormal detection device according to the first embodiment.

FIG. 7 is a flowchart of processing performed by the performance information analysis section 220.

The performance information analysis section 220 is a functional section for converting information acquired from the access log 201 into such performance information as total access counts and access counts by URL. The performance information analysis section is invoked by the log collection control section 210 and records performance information in the performance status management table 280.

First, in step S700, associative array urlCount_h including URL character strings as keys is initialized. Next, in step S701, one record is acquired from accessLog, and the values in the date 301 column, time 302 column, and requested URL 303 column are stored in scalar variables date, time, and url, respectively. The accessLog represents the most recent one-hour portion of the access log 201 described with reference to FIG. 6 and is structured similarly to the access log 201. In step S702, the urlCount_h element value whose key is url is incremented, thereby updating the number of accesses by URL. In step S703, whether or not the accessLog has a next record is determined. When the accessLog has a next record, processing returns to step S701 to repeat updating the access count. When there is no next record, processing advances to step S704. In step S704, time data "st-end" is generated, "st" representing the "hh" value included in time data hh:mm:ss and "end" representing "hh" value plus 1, and the st-end is stored in scalar variable timeSlot. This determines a time period. In step S705, the values of all elements of urlCount_h are totalized to obtain the total number of accesses, and the total number is stored in scalar variable totalCount_h. In step S706, a unique value linking date and timeSlot is generated and stored in scalar variable id. This processing can be realized, for example, by preparing a linear function of arguments date and timeSlot. In step S707, a record including performance ID 501=id, date 502=date, time 503=timeSlot, and total access count 504=totalCount_h is added to the performance status management table 500. In step S708, one element is read from urlCount_h, and its key URL and value are stored in key and scalar variable value, respectively. In step S709, a record including performance ID 511=id, requested URL 512=key, and access count 513=value is added to the performance status management table 510. In step S710, whether or not urlCount_h has a next element is determined. When urlCount_h has a next element, processing returns to step S708 to repeat adding a record to the performance status management table 510. When there is no next element, processing is terminated. The above steps realize performance information extraction from the access log 201.

Figure 8:
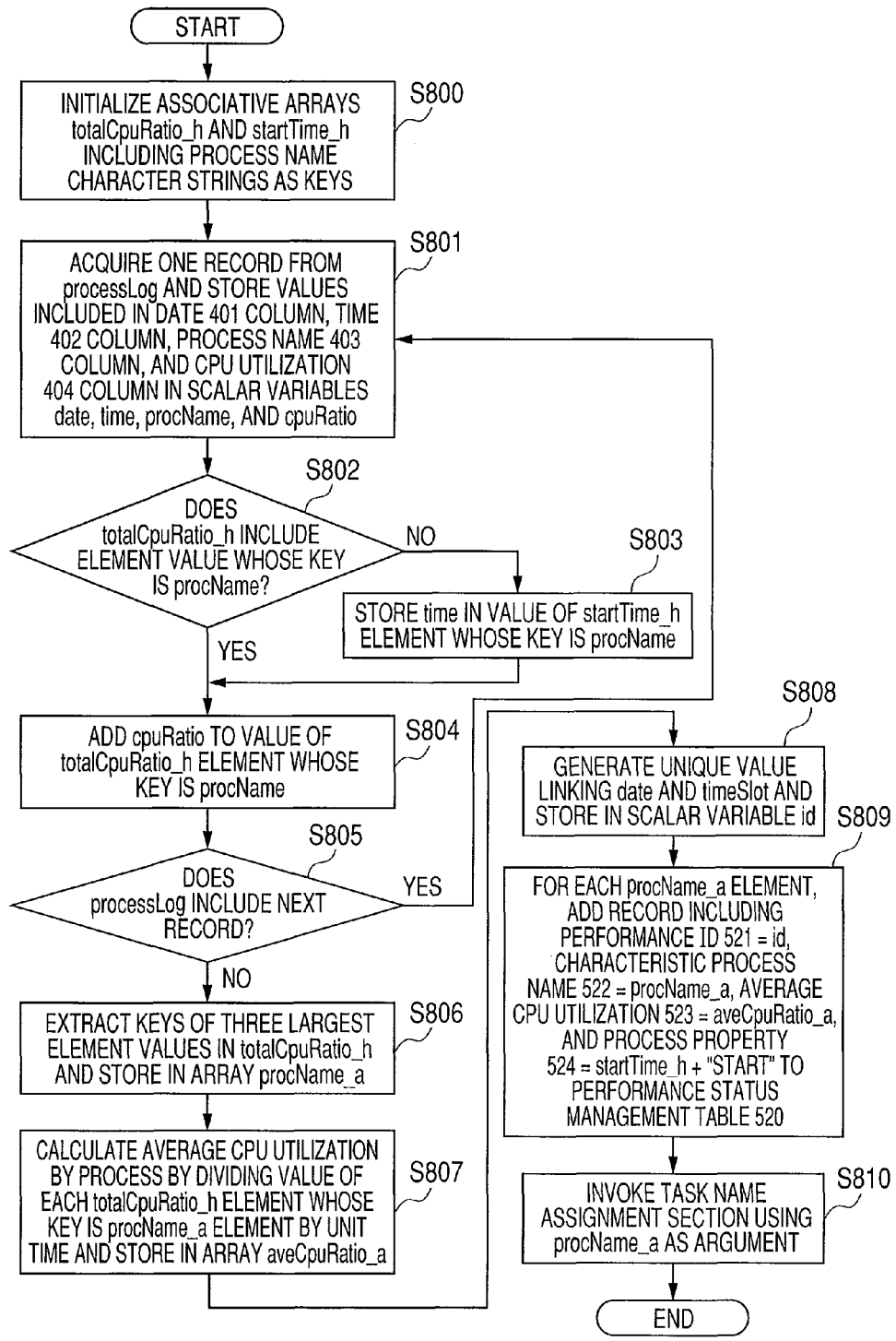
FIG. 8 is a flowchart of example processing performed by a process status analysis section of the abnormal detection device according to the first embodiment.

FIG. 8 is a flowchart of processing performed by the process status analysis section 230.

The process status analysis section 230 is a functional section for converting information obtained from the process performance log into process status information. The process status analysis section 230 is invoked by the log collection control section 210 and records performance information in the performance status management table 280. The process status information is information about process performance, that is, information indicating what combination of processes were performed at what timings using what resources.

First in step S800, associative arrays totalCpuRatio_h and startTime_h including process name character strings as keys are initialized. Next, in step S801, one record is acquired from processLog, and the values in the date 401 column, time 402 column, process name 403 column, and CPU utilization 404 column are stored in scalar variables date, time, procName, and cpuRatio, respectively. The processLog represents the most recent one-hour portion of the process performance log 202 described with reference to FIG. 6 and is structured similarly to the process performance log 202. In step S802, it is determined whether or not any element value whose key is procName is included in totalCpuRatio_h. When such a value is included n totalCpuRatio_h, processing advances to step S803. When no such value exists, processing advances to step S804. In step S803, time is stored in the startTime_h element value whose key is procName. Processing then advances to step 804. In this way, the time at which each process was first started can be recorded, so that a process property can be generated. The process property is information characteristic of a process. In the present embodiment, the process start time is used as a process property. The process property is used to improve data readability on the monitoring screen, being described later, for the system manager. It may be a different kind of information characteristic of the corresponding process, for example, the name of a parent process, process performance time, name of the communication port used by the process, or the amount of computer resources occupied by the process.

In step S804, cpuRatio is added to the totalCpuRatio_h element value whose key is procName. This updates the CPU utilization by process as a cumulative value. In step S805, whether or not processLog has a next record is determined. When processLog has a next record, processing returns to step S801 to repeat updating the cumulative CPU utilization by process. When there is no next record, processing advances to step S806. In step S806, the keys of the three largest element values in totalCpuRatio_h are extracted and stored in array procName_a. In this way, characteristic processes performed during each unit time period can be extracted. The CPU utilizations to be compared may be average values instead of cumulative values. The above processing is for extracting processes associated with a task assumed to have caused a tendency of data values obtained by the performance information analysis section 220.

Next, in step S807, an average CPU utilization by process is calculated by dividing each of the totalCpuRatio_h element values each using a procName_a element as a key by a unit time period, and the values obtained are stored in array aveCpuRatio_a. The unit time period equals the interval time at which the log collection control section 210 is started but converted into time unit of the interval time at which a process performance log is generated. In the present embodiment, the unit time period is 3600. In this way, the average CPU utilization by characteristic process can be obtained. In step S808, a unique value linking date and timeSlot is generated and stored in scalar variable id. This step is similar to step S706 shown in FIG. 7. In step S809, for each element of procName_a, a record including performance ID 521=id, characteristic process name 522=procName_a, average CPU utilization 523=aveCpuRatio_a, and process property 524=startTime_h+"START" is added to the performance status management table 520.

In step S810, the task name assignment section is invoked using procName_a as an argument.

The above steps realize process status extraction from the process performance log 202.

FIG. 9 is a flowchart of processing performed by the task name assignment section 240.

The task name assignment section 240 is a functional section to assign a task name to improve data readability on the monitoring screen, being described later, for the system manager. A task name is the name of a task assumed, based on process status, to have caused a tendency of performance information values. It refers to an operating status as a whole of the web server device 203. A task name may be, for example, an application name determined according to a process name based on the process status information received from the process status analysis section 230. Or, a name determined by the system manager for use in system management and associated with a system management tool may be assigned as a task name. The task name assignment section 240 is invoked by the process status analysis section 230 and records a task name in the performance status management table 280.

First, in step S900, for each element of procName_a, an application name is acquired by making a process name inquiry to the OS 204 and stored in scalar variable taskname. The procName_a represents a characteristic process name generated by the process status analysis section 230. When using a task name associated with a system management tool and used for system management by the system manager, a name can be determined by making an inquiry to the system management tools instead of the OS. In step S901, for each element of procName_a, a record having values of performance ID=id, process name 531=procName_a, and task name=taskname is added to the performance status management table 530. The above steps realize task name extraction from characteristic process names.

FIG. 10 is a diagram showing the structure of the entry extraction rule 290 stored in the external storage device 124. The entry extraction rule 290 is a selection rule table managing selection rules for entry extraction. The selection rules are applied when the abnormality determination section 250, being described later, extracts entries from the performance status management table 280 stored in the external storage device 124 according to conditions, such as day of the week and time, making up an environment in which the web server device 203 is operating. The entry extraction rule 290 has such columns as a day-of-the-week condition 1001, a time period condition 1002, and a characteristic process 1003. The day-of-the-week condition 1001 column and the time period condition 1002 column provide day-of-the-week and time period conditions making up an environment in which the web server device 203 is operating. The characteristic process 1003 column provides conditions for extracting entries meeting the environmental conditions. Namely, when abnormality detection is performed in an environment defined by conditions included in the day-of-the-week condition 1001 column and time period condition 1002 column, entries with corresponding characteristic processes included in the characteristic process 1003 column are extracted from the performance status management table 280. The entry extraction rule 290 is to be generated entirely by the system manager. Though not described for the present embodiment, the characteristic process combinations most used in the past in the environments defined by the conditions included in the day-of-the-week condition 1001 column and time period condition 1002 column may be recorded by the process status analysis section 230.

Figure 11:
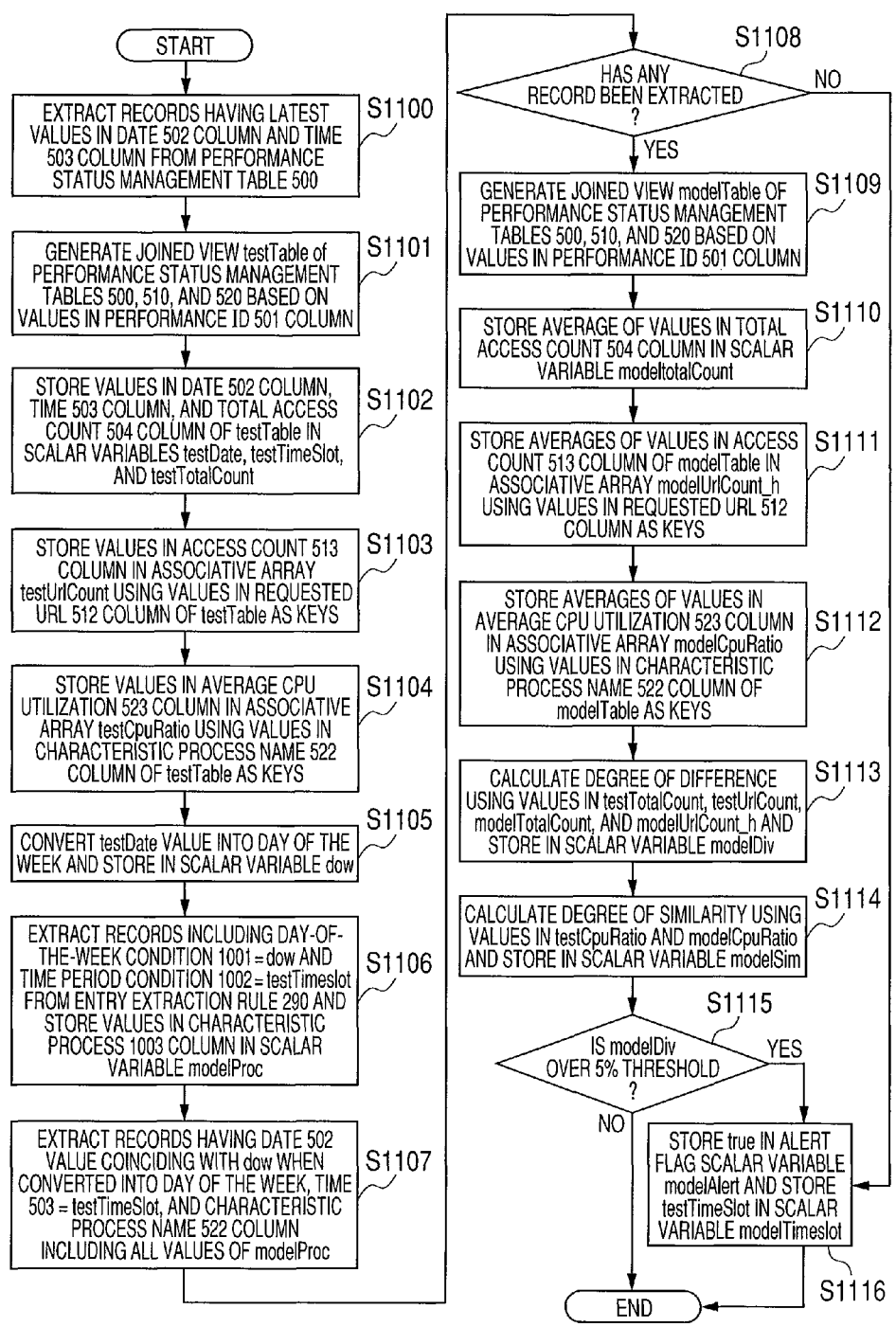
FIG. 11 is a flowchart of example processing performed by an abnormality determination section of the abnormality detection device according to the first embodiment.

FIG. 11 is a flowchart of processing performed by the abnormality determination section 250. The abnormality determination section 250 is invoked by the log collection control section 210 and performs abnormality determination based on the performance status management table 280 and the entry extraction rule 290 stored in the external storage device 124. To detect abnormality, a statistical degree of difference between model data and current performance status is calculated. When the statistical degree of difference exceeds a certain level, the current performance status is determined abnormal. The model data is prepared by extracting, based on past performance status, entries mutually matching in terms of day of the week, time period, and process status and by averaging their performance information values. The entry extraction is carried out complying with the entry extraction rule 290 that is a selection rule table.

First, in step S1100, the records with the date 502 column and time 503 column showing the latest values are extracted from the performance status management table 500. Next, in step S1101, a joined view testTable of the performance status management tables 500, 510, and 520 is generated based on the values in the performance ID 501 column. In step S1102, the values in the date 502 column, time 503 column, and total access count 504 column of testTable are stored in scalar variables testDate, testTimeSlot, and testTotalCount, respectively. In step S1103, using the values in the requested URL 512 column of testTable as keys, the values in the access count 513 column are stored in associative array testUrlCount. In step S1104, using the values in the characteristic process name 522 column of testTable as keys, the values in the average CPU utilization 523 column are stored in associative array testCpuRatio.

Performing steps S1100 through S1104 is acquiring test data from the performance status management table 280. The "test data" refers to data to be determined abnormal or not. A joined view of tables can be obtained using a relational database join function. In step S1105, the testDate value is converted into day of the week, then stored in scalar variable dow.

In step S1106, records including the day-of-the-week condition 1001=dow and the time period condition 1002=testTimeSlot are extracted from the entry extraction rule 290, and the values in the characteristic process 1003 column are stored in scalar variable modelProc. In step S1107, records including the date 502 value that coincides with dow when converted into day of the week, the time 503=testTimeSlot, and the characteristic process name 522 column including all values of modelProc are extracted. In step S1108, whether or not any record has been extracted through steps S1106 and S1107 is determined. When no record has been extracted, processing skips to step S1116. When there is an extracted record, processing advances to step S1109.

In step S1109, a joined view modelTable of the performance status management tables 500, 510, and 520 are generated based on the values in the performance ID 501 column. In step S1110, an average of the values in the total access count 504 column of modelTable is stored in scalar variable modelTotalCount. In step S1111, averages of values in the access count 513 column of modelTable are stored in associative array modelUrlCount_h using the values in the requested URL 512 column as keys.

In step S1112, averages of the values in the average CPU utilization 523 column are stored in associative array modelCpuRatio using the values in the characteristic process name 522 column of modelTable as keys. Performing steps S1109 through S1112 is generating model data from the performance status management table 280. The "model data" refers to data representing normal status for use in determining whether or not test data is abnormal. In step S1113, a degree of difference is calculated using the values in testTotalCount, testUrlCount, modelTotalCount, and modelUrlCount_h, and stored in scalar variable modDiv. The degree of difference is a statistic such as a chi-square value which will be described later.

In step S1114, a degree of similarity is calculated using values stored in testCpuRatio and modelCpuRatio and stored in scalar variable modSim. The degree of similarity refers to, for example, an angle between vectors which will be described later. In step S1115, whether modDiv is over a threshold of 5% is determined. When modDiv is over 5%, processing advances to step S1116. When modDiv is not over 5%, processing is terminated. In step S1116, true is stored in alert flag scalar variable modelAlert, and testTimeSlot is stored in scalar variable modelTimeslot. An alert flag is used to determine whether to display an alert message on the monitoring screen being described later.

The algorithm for abnormality detection performed using a chi-square value will be described below.

First, a chi-square distribution will be described. For abnormality value calculation, a chi-square distribution generally used in statistical testing is used. A chi-square distribution has "n" degrees of freedom depending on the number of data points.

In abnormality determination, a chi-square value with upper probability α on a chi-square distribution, i.e. the value of $\chi 2$ in the following equation, is used for comparison.

$$\int \chi 2 d\chi 2 = \alpha \quad (1)$$

Next, a polynomial distribution and an x-square distribution will be described. Assume that: there are "k" mutually exclusive events Ai; P(Ai)=Pi(i=1, 2, . . . , k); and A1UA2U—UAk=Ω, where Ω is whole event. The frequency of event Ai occurrence in "n" independent trials is represented by random variable Xi(i=1, 2, . . . , k).

Where n is large enough, $\chi 2$ can be approximated by a chi-square distribution with "k−1" degrees of freedom.

$$\chi 2 = \Sigma (Xi - n*Pi)2/n*Pi \quad (2)$$

where n*Pi≧5, and n*Pi represents an expected frequency of event Ai occurrence.

The application of the above algorithm to the present embodiment will be described in the following. The chi-square distribution of (1) is applied for abnormality determination as follows. Assume that: for model data, a total access count is represented by N, and an access count by URL is represented by Ni(i=1 to k). Also assume that: for test data, a total access count is represented by n, and a hit count by URL is represented by ni(i=1 to k). Based on the model data, it is estimated that Pi={N1/N, . . . , Nk/N}.

Since ith expected value of the test data is n*Ni/N and the observed value is ni:

$$\chi 2 = \Sigma (ni - n*Ni/N)/n*(Ni/N) \quad (3)$$

Using the above value for a chi-square distribution with "k−1" degrees of freedom, the chi-square value with upper probability α can be calculated. Namely, determining that there is abnormality when the chi-square value exceeds the above value applied as a threshold value is equivalent to determining, with the model data value regarded as ideal, that there is abnormality when a test data value is observed to be at a level of α/100% or below (a difference of α% is regarded as indicating abnormality).

Even though, in the present embodiment, the degree of difference is calculated by chi-squared test using the access count by URL and the total access count, any other test method may be used as long as upper probability can be defined by comparing scalars or vectors representing performance status. Alternative methods which may be used include G testing, Bayesian hypothesis testing or multinomial testing, Fisher's exact testing, and variance analysis by Scheffe's method or Tukey's method.

In the following, an algorithm for obtaining a degree of similarity based on an angle between vectors will be described. Assume that processes being performed based on model data and average CPI utilizations are represented by a1 to ak and Ai (i=1 to k), respectively, and that processes being performed based on test data and average CPU utilizations are represented by b1 to bk and Bi (i=1 to k), respectively.

The degree of similarity between vectors, i.e. between model data vector A=(A1, A2, . . . , Ak) and test data vector B=(B1, B2, . . . , Bk), is calculated as (4) below.

$$<A, B>/\|A\|\|B\| \quad (4)$$

where <A, B> represents the inner product of vectors A and B, and ∥A∥ represents the norm of vector A.

When vectors A and B are most similar to each other, the degree of similarity between them is 1. When they are least similar to each other, the degree of similarity between them is 0. When the combination of processes is the same between test data and model data and the CPU utilization by process is mutually similar between them, the test data can be evaluated as being highly similar to the model data by calculating the degree of similarity between their vectors. The above steps realize extracting degrees of difference and similarity from the performance status management table 280.

Figure 12:
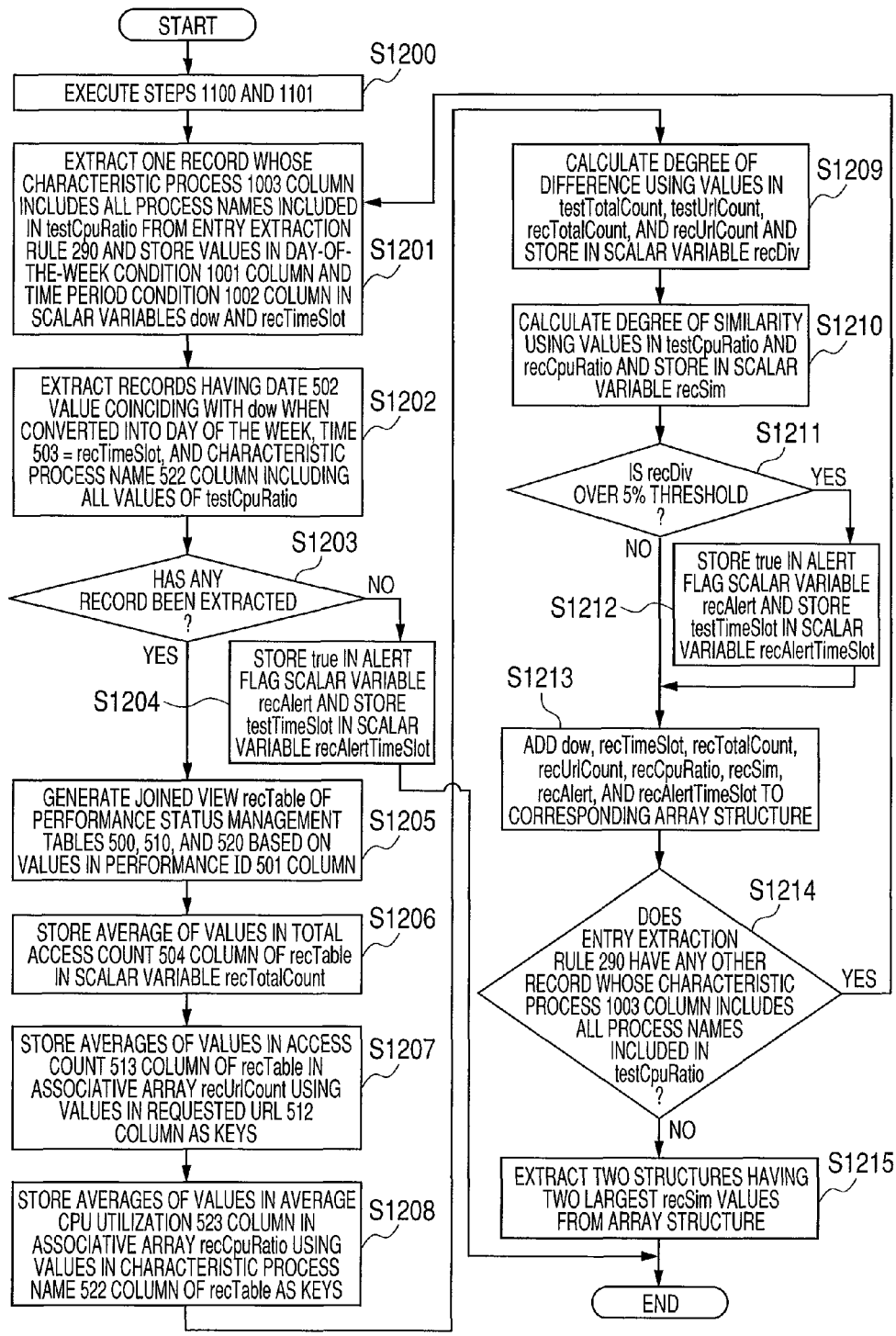
FIG. 12 is a flowchart of example processing performed by a similar performance status extraction section of the abnormality detection device according to the first embodiment.

FIG. 12 is a flowchart of processing performed by the similar performance status extraction section 270.

The similar performance status extraction section 270 is invoked by the log collection control section 210 and performs processing similar to that performed by the abnormality determination section 250 by using model data representing process performance status similar to the current performance status based on the performance status management table 280 and the entry extraction rule 290 stored in the external storage device 124.

The processing steps performed by the similar performance status extraction section 270 will be described in the following. The processing is similar to that performed by the abnormality determination section 250, but, unlike the abnormality determination section 250, the similar performance status extraction section 270 extract entries not from the entry extraction rule 290 but from the performance status management table 280 using characteristic processes included in the test data as keys.

First, in step S1200, steps S1100 and S1101 are executed. Performing this process is acquiring test data from the performance status management table 280. Next, in step S1201, a record whose characteristic process 1003 column includes all process names included in testCpuRatio is extracted from the entry extraction rule 290, and the values in the day-of-the-week condition 1001 column and time period condition 1002 column of the record are stored in scalar variables dow and recTimeSlot, respectively.

In step S1202, records having the date 502 value that coincides with dow when converted into day of the week, the time 503=recTimeSlot, and the characteristic process name 522 column including all values of testCpuRatio are extracted. In step S1203, whether or not any record has been extracted through steps S1201 and S1202 is determined. When no record has been extracted, processing advances to step S1204. When there is an extracted record, processing advances to step S1205. In step S1204, true is stored in alert flag scalar variable recAlert, and testTimeSlot is stored in scalar variable recAlertTimeSlot. Processing is then terminated.

In step S1205, a joined view recTable of the performance status management tables 500, 510, and 520 are generated based on the values in the performance ID 501 column. In step S1206, an average of the values in the total access count 504 column of recTable is stored in scalar variable recTotalCount. In step S1207, averages of the values in the access count 513 column of recTable are stored in associative array recUrlCount using the values in the requested URL 512 column as keys.

In step S1208, averages of the values in the average CPU utilization 523 column are stored in associative array recCpuRatio using the values in the characteristic process name 522 column of recTable as keys.

In step S1209, a degree of difference is calculated using values stored in testTotalCount, testUrlCount, recTotalCount, and recUrlCount and stored in scalar variable recDiv. In step S1210, a degree of similarity is calculated using values stored in testCpuRatio and recCpuRatio and stored in scalar variable recSim.

In step S1211, whether recDiv is over a threshold of 5% is determined. When recDiv is over 5%, processing advances to step S1212. When recDiv is not over 5%, processing advances to step S1213. In step S1212, true is stored in alert flag scalar variable recAlert, and testTimeSlot is stored in scalar variable recAlertTimeSlot. Processing then advances to step S1213. In step S1213, dow, recTimeSlot, recTotalCount, recUrlCount, recCpuRatio, recSim, recAlert, and recAlertTimeSlot are added to a corresponding array of structures. This is to retain candidate data to be recommended as model data.

In step S1214, whether, in the entry extraction rule 290, there is any other record whose characteristic process 1003 column includes all process names included in testCpuRatio is determined. When there is such a record, processing returns to step S1201 to repeat model data candidate extraction. When there is no such a record, processing advances to step S1215. In step S1215, data of the two structures having the two largest recSim values in the array of structures are extracted for use as recommended model data:

The concept of "recommended model data" is as follows. In the present embodiment, the abnormality detection device determines abnormality using model data generated by the entry extraction rule 290. Generally, the rule is fixedly determined for events periodically taking place according to day of the week or time period of the day. Not all events to be performed are periodical, however, Unexpected events also occur. There may be cases where performance status used to analyze an unexpected event is not appropriate. In such cases, model data is generated using past data about processes similar to the current process and recommended for use in current abnormality determination.

Figure 13:
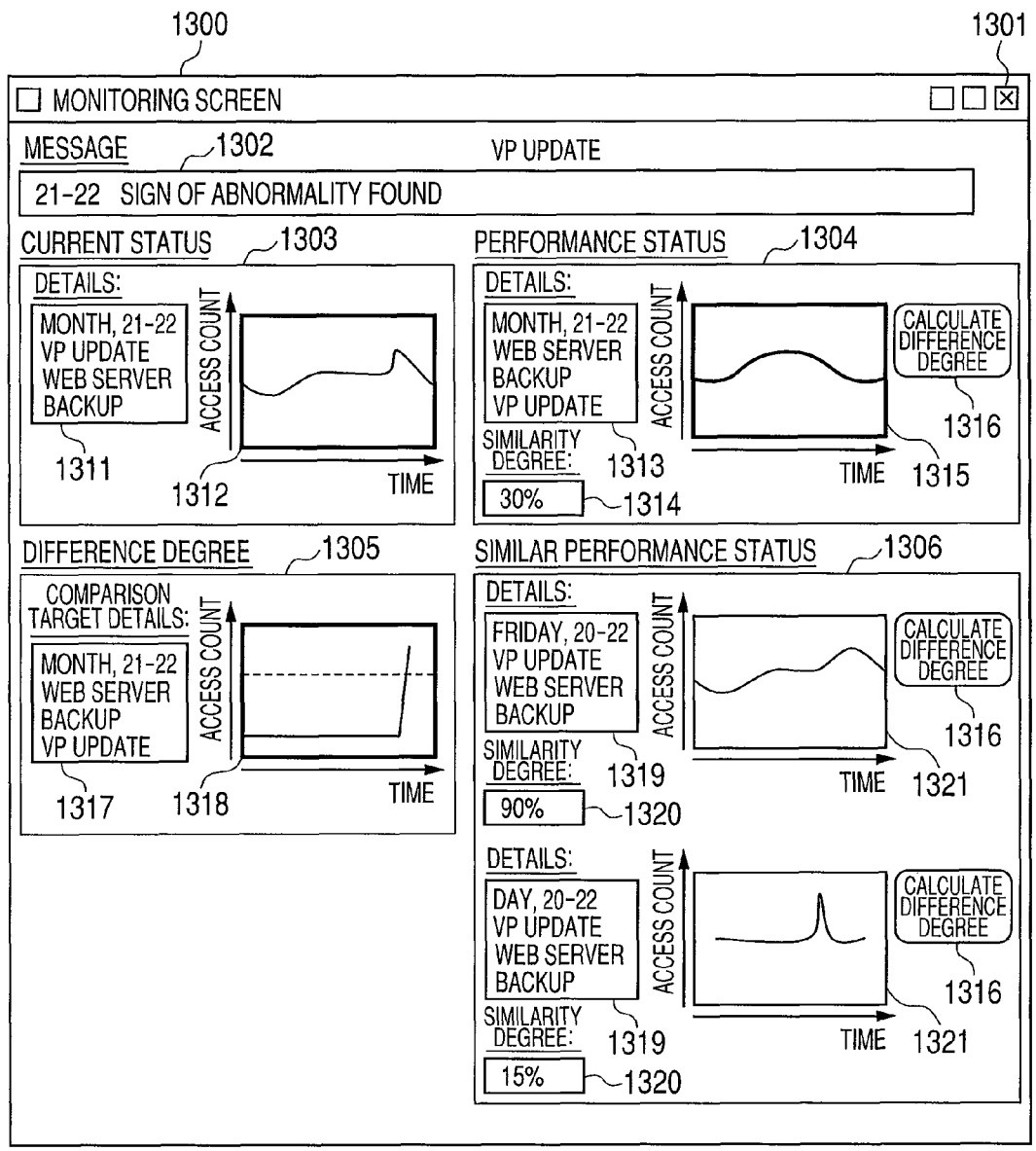
FIG. 13 is a diagram showing an example arrangement of a monitoring screen of the abnormality detection device according to the first embodiment.

FIG. 13 is a diagram showing the arrangement of the monitoring screen 1300 of the abnormality detection device. The monitoring screen is generated by the U/I control display section 260. It displays a model data graph, a current performance status graph, and the degree of difference between model data and current performance status. The model data graph, the degree of difference, and the current performance status graph are accompanied by such information as process status and a task name. A graph of recommended model data generated based on the model data received from the similar performance status extraction section and data used to generate the model data is also displayed. The recommended model data graph is accompanied by such information as process status and a task name. The monitoring screen displaying such graphs and information is aimed at showing the system manager reasons for abnormality determination. Showing reasons for abnormality determination makes it easier for the system manger to make required judgment. For example, when unexpected updating of virus patterns for antivirus software occurs, the system load increases causing the system throughput to lower and access counts to decrease. The system performance in such a state differing from the performance in a normal state may be determined to be abnormal, but the process status shown along the current performance status lets the system manager know that virus patterns are being updated. Moreover, the process status shown along the recommended model data lets the system manager know that the access count decrease is attributable to updating of virus patterns. Thus, the system manager can determine that the current status is not abnormal.

The monitoring screen 1300 displayed on the display section includes a close button 1301, a message display section 1302, a current status display section 1303, a performance status display section 1304, a difference degree display section 1305, and a similar performance status display section 1306. The close button 1301 is for closing the monitoring screen 1300. The message display section 1302 displays a message, for example, for notifying the system manager of abnormality detection. Whether to display such a message is determined according to whether true is stored in such variables as modelAlert and recAlert, and a message is generated when required.

Notification to the system manager may be made by sound or color, too. The current status display section 1303 is for displaying the current status. It includes a current status detail display section 1311 and a current status graph display section 1312. These are generated using values stored in testTimeSlot, testTotalCount, and testCpuRatio.

The performance status display section 1304 is for displaying performance status. It includes a performance status detail display section 1313, a similarity degree display section 1314, a performance status graph 1315, and a difference degree calculation button 1316. These are generated using values stored in testTimeSlot, modelTotalCount, modelCpuRatio, and modSim. The difference degree calculation button 1316 is used to switch the display in the difference degree display section 1305 to a corresponding value.

The difference degree display section 1305 is for displaying a degree of difference between the current status and past performance status. It includes a comparison target detail display section 1317 and a difference degree graph display section 1318. These are generated by selectively using testTimeSlot, modelCpuRatio, and modDiv or recTimeSlot, recCpuRatio, and recDiv.

The similar performance status display section 1306 is for displaying performance status similar to the current status. It includes similar performance status detail display sections 1319, similar performance status similarity degree display sections 1320, similar performance status graph display sections 1321, and difference degree calculation buttons 1316. These are generated using values stored in recTimeSlot, recTotalCount, recCpuRatio, and recSim.

FIG. 14 is a diagram showing an example structure of a dialog displayed on the monitoring screen of the abnormality detection device according to the first embodiment.

The dialog 1400 includes a task name 1401 column, an average CPU utilization 1402 column, a process property column 1403 column, and an OK button 1404. This screen can be generated by using the performance status management tables 520 and 530. The OK button 1404 is used to close the dialog 1400. The dialog 1400 is displayed when a detail display on the monitoring screen 1300 is clicked with a mouse and shows the process property information associated with the corresponding graph display. The dialog 1400 may be a popup which appears when the cursor is placed on a detail display on the monitoring screen 1300. Also, the information included in the dialog 1400 may be included in the corresponding detail display section on the monitoring screen 1300.

An example of processing according to the first embodiment has been described. Even though, in the first embodiment, an access log is used to obtain required data, a different means may be used as long as data values which vary with the performance status of a web server can be calculated. The target of monitoring is not limited to a web server. It may be a computer system other than a web server. As described above, displaying a result of abnormality determination and reasons for the determination allows a system manager to make his or her judgment in a shorter time even in a case of erroneous abnormality detection which has been difficult for system managers to deal with appropriately.

Second Embodiment

In the configuration according to a second embodiment of the present invention, after abnormality is detected in the web server device 203 by the abnormality detection device 120, the entry extraction rule can be updated by selecting a reflection button not to cause erroneous abnormality detection.

Figure 15:
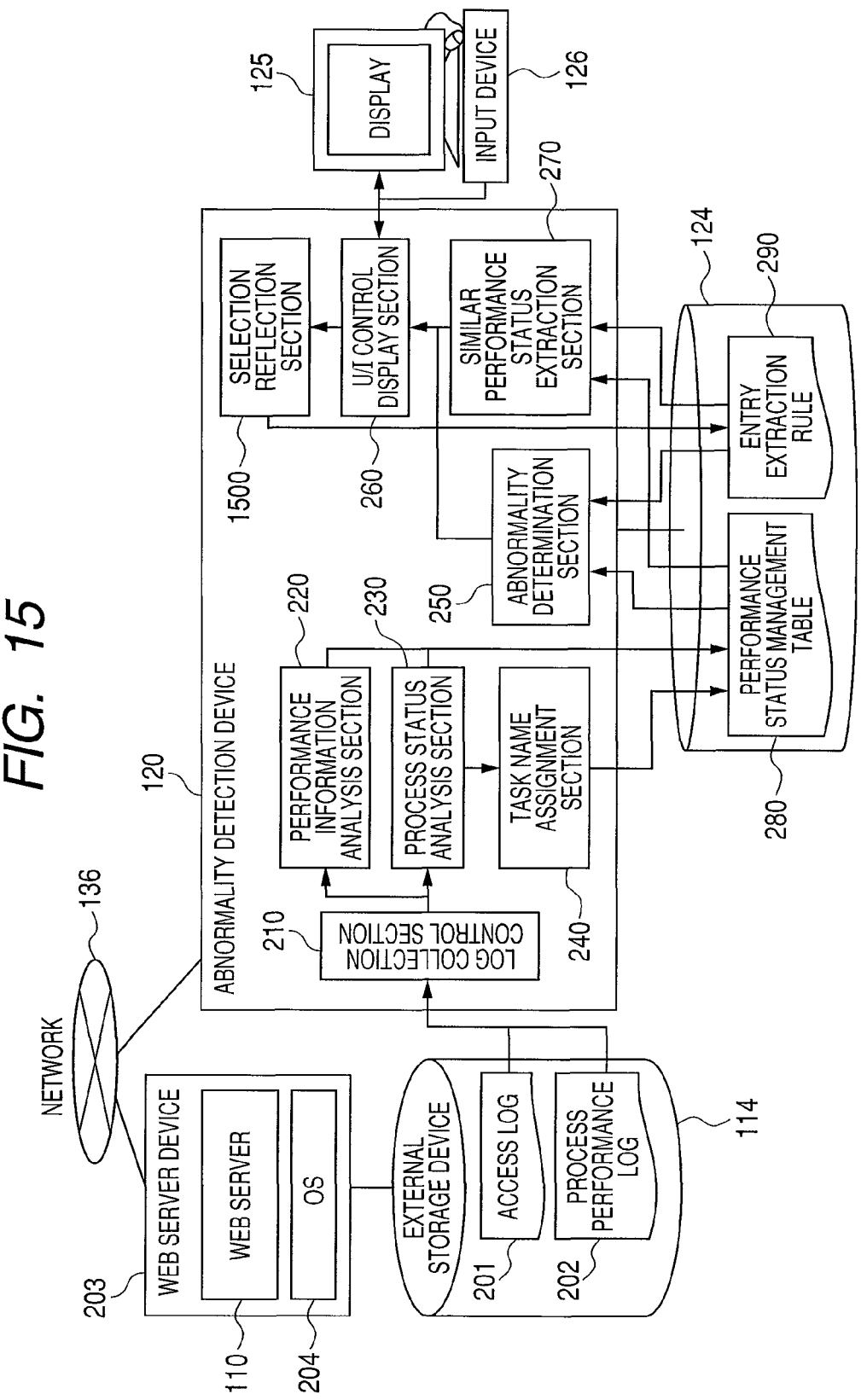
FIG. 15 is a block diagram showing example constituent functional elements of an abnormality detection device according to a second embodiment.

FIG. 15 is a block diagram showing constituent functional elements of a program which operates in the abnormality detection device 120. The program structure is the same as in the first embodiment except that a selection reflection section 1500 is included in the program for the second embodiment. The selection reflection section 1500 is a functional section for updating the entry extraction rule 290 when a reflection button is selected.

FIG. 16 is a flowchart showing an example of processing performed by the selection reflection section. First, in step S1600, an editing screen 1700 for inputting conditions used to generate recommended performance status in the entry extraction rule 290 is displayed. The editing screen 1700 will be described later. Next, in step S1601, the entry extraction rule is updated. These steps realize updating of the entry extraction rule 290.

FIG. 17 is a diagram showing an example structure of the entry extraction rule editing screen 1700. The entry extraction rule editing screen 1700 includes a message section 1701, a Yes button 1702, a No button 1703, a close button 1704, a day-of-the-week condition 1705 column, a time period condition 1706 column, a task name ID 1707 column, a day-of-the-week condition 1711 column, a time period condition 1712 column, and a task name ID 1713 column. The message section 1701 always displays a message "Do you reflect the selection in the rule?" The values in the day-of-the-week condition 1705, time period condition 1706, and task name ID 1707 columns are generated from the current performance status representing the performance status at the time when the entry extraction rule editing screen 1700 is displayed. The values in the day-of-the-week condition 1711, time period condition 1712, and task name ID 1713 columns are generated from the entry extraction rule 290 and the performance status management table 530. When the Yes button 1702 is selected, the current status is added to the entry extraction rule. When the No button 1703 is selected, the entry extraction rule editing screen 1700 is closed immediately. This allows the system manager, when he or she determines that the entry extraction rule is erroneous, to update with ease the entry extraction rule based on the current status, so that the updated entry extraction rule is applied to the subsequent abnormality determination.

Figure 18:
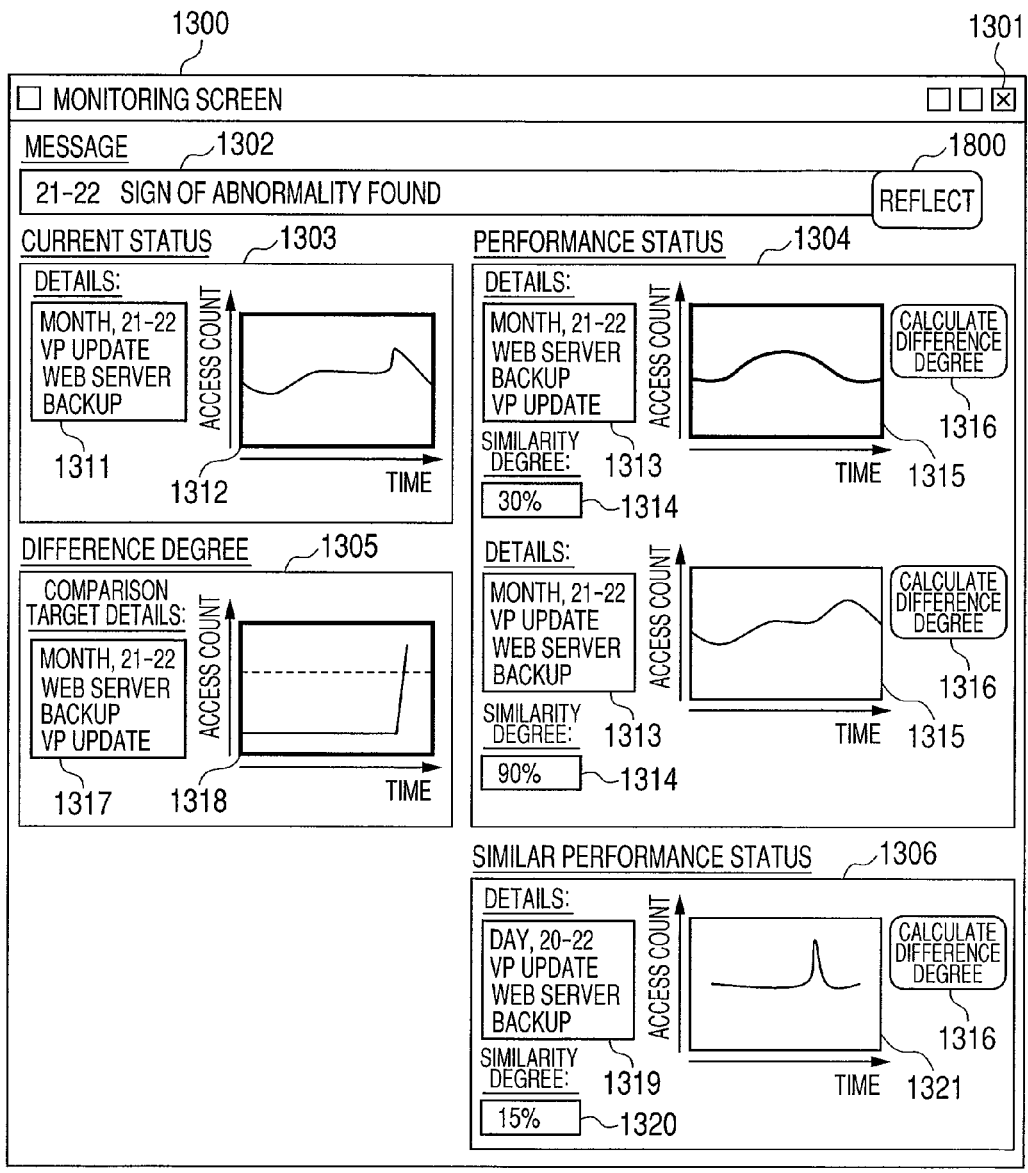
FIG. 18 is a diagram showing an example arrangement of a monitoring screen of the abnormality detection device according to the second embodiment.

FIG. 18 is a diagram showing an example arrangement of the monitoring screen. The arrangement is the same as in the first embodiment except that a reflection button 1800 is included in the monitoring screen for the second embodiment and also that the performance status display section 1304 is different between the first and the second embodiment. The reflection button 1800 is used to display the entry extraction rule editing screen 1700. The performance status display section 1304 shows plural candidate data, because, with the entry extraction rule 290 updated, abnormality determination is carried out based on plural performance statuses. The target system may be determined abnormal when all of the plural performance statuses indicate abnormality or when any of the plural performance statuses indicates abnormality.

An example processing according to the second embodiment has been described. As described above, displaying detected abnormality and reflecting selected data in the performance status selection rule used for abnormality determination can improve the suitability of the selection rule used for abnormality determination to eventually improve the accuracy of abnormality detection represented, for example, by reproducibility and the goodness of fit.

The present invention is not limited to the foregoing two embodiments, and a wide variety of modifications are possible without departing from the scope of the invention.

The present invention is useful as an abnormality detection technique making use of past and current performance information on a device to be monitored.

What is claimed is:

1. An abnormality detection method for detecting abnormality in a system to be monitored, the method using a device including a processing section and a storage section,
   wherein the processing section executes the steps of:
   acquiring an access log and a process performance log from the system to be monitored;
   sorting the acquired access log by time and recording the sorted access log as performance information by time;
   extracting one or more process statuses corresponding to the recorded performance information by time from the acquired process performance log;
   executing a task name assignment procedure to obtain one or more task names from the one or more extracted process statuses;
   associating the one or more task names with the performance information by time and recording as one or more performance statuses; and
   detecting abnormality based on a current performance status and a past performance status,
   wherein the step of detecting abnormality includes calculating a degree of difference between a current performance status and a past performance status included in the one or more recorded performance statuses,
   wherein the device is further provided with a display section; and
   wherein the processing section further executes the steps of:
   displaying the current performance status, the past performance status, the task names associated with the current and past performance statuses, and the calculated degree of difference on the display section;
   sorting the one or more past performance statuses by the one or more associated task names;
   selecting one of the one or more sorted past performance statuses according to a selection rule for use in calculating the degree of difference; and
   calculating degrees of similarity between the task name associated with the current performance status and the one or more task names associated with the one or more sorted past performance statuses.

2. The abnormality detection method according to claim 1, wherein the task name assignment procedure includes obtaining the one or more task names based on timings at which processes of the one or more extracted process statuses were started and ended.

3. The abnormality detection method according to claim 1, wherein the step of displaying includes displaying one or more of the one or more past performance statuses whose calculated degrees of similarity are high.

4. An abnormality detection device for detecting abnormality in a system to be monitored, comprising:
   a processing section; and
   a storage section,
   wherein the processing section includes:
   a log collection control section which acquires an access log and a process performance log from the system to be monitored;
   a performance information analysis section which sorts the acquired access log by time and records the sorted access log as one or more performance statuses by time;

a process status analysis/task name assignment section which extracts one or more process statuses of the one or more recorded performance statuses from the process performance log, obtains one or more task names from the one or more extracted process statuses, and records the one or more task names, associating them with the one or more recorded performance statuses; and a difference degree calculation section which calculates a degree of difference between a current performance status and a past performance status included in the one or more recorded performance statuses, wherein the processing section further includes a user interface control section which outputs and displays the current performance status, the past performance status, the task names associated with the current and past performance statuses, and the calculated degree of difference, wherein the storage section is provided with a selection rule table applied to select one of the one or more past performance statuses for use by the difference degree calculation section in calculating a degree of difference, and wherein the performance information analysis section performs:
   sorting the one or more past performance statuses by the associated task names,
   selecting one of the one or more recorded past performance statuses according to the selection rule table for use in calculating the degree of difference; and
   calculating degrees of similarity between the task name associated with the current performance status and the one or more task names associated with the one or more sorted past performance statuses.

5. The abnormality detection device according to claim 4, further comprising a display section,
   wherein the user interface control section displays one or more of the one or more performance statuses whose calculated degrees of similarity are high.

6. A non-transitory computer readable storage medium storing an abnormality detection program for a device which includes a processing section and a storage section and which detects abnormality in a system to be monitored, the program causing the processing section to execute the steps of:
   acquiring an access log and a process performance log from the system to be monitored;
   sorting the acquired access log by time and recording the sorted access log as performance information by time;
   extracting one or more process statuses corresponding to the performance information by time from the acquired process performance log;
   executing a task name assignment procedure to obtain one or more task names from the one or more extracted process statuses;
   associating the one or more task names with the performance information and recording as one or more performance statuses; and
   detecting abnormality based on a current performance status and a past performance status, wherein the step of detecting abnormality includes calculating a degree of difference between a current performance status and a past performance status included in the one or more recorded performance statuses, wherein the processing section is caused to execute the step of outputting the current performance status, the past performance status, the task names associated with the current and past performance statuses, and the calculated degree of difference, wherein the processing section is caused to further execute the steps of:
   sorting the past performance statuses by the associated task names;
   selecting one of the one or more sorted past performance statuses according to a selection rule for use in calculating the degree of difference; and
   calculating degrees of similarity between the task name associated with the current performance status and the one or more task names associated with the one or more sorted past performance statuses, and wherein the step of outputting includes displaying one or more of the one or more performance statuses whose calculated degrees of similarity are high.

7. The non-transitory computer readable storage medium storing the abnormality detection program according to claim 6, wherein the task name assignment procedure includes obtaining the one or more task names based on timings at which processes of the one or more extracted process statuses were started and ended.

* * * * *